(12) United States Patent
Zimovnov et al.

(10) Patent No.: US 11,263,217 B2
(45) Date of Patent: Mar. 1, 2022

(54) METHOD OF AND SYSTEM FOR DETERMINING USER-SPECIFIC PROPORTIONS OF CONTENT FOR RECOMMENDATION

(71) Applicant: YANDEX EUROPE AG, Lucerne (CH)

(72) Inventors: Andrey Vadimovich Zimovnov, Moscow (RU); Yevgeny Andreevich Sokolov, Belaya Kalitva (RU)

(73) Assignee: YANDEX EUROPE AG, Lucerne (CH)

( * ) Notice: Subject to any disclaimer, the term of this patent is extended or adjusted under 35 U.S.C. 154(b) by 382 days.

(21) Appl. No.: 16/372,553

(22) Filed: Apr. 2, 2019

(65) Prior Publication Data

US 2020/0089724 A1    Mar. 19, 2020

(30) Foreign Application Priority Data

Sep. 14, 2018    (RU) .......................... RU2018132713

(51) Int. Cl.
| | |
|---|---|
| *G06F 16/2457* | (2019.01) |
| *G06F 16/9536* | (2019.01) |
| *G06F 16/9538* | (2019.01) |

(52) U.S. Cl.
CPC .... *G06F 16/2457* (2019.01); *G06F 16/24575* (2019.01); *G06F 16/9536* (2019.01); *G06F 16/9538* (2019.01)

(58) Field of Classification Search
CPC .......... G06F 16/2457; G06F 16/24575; G06F 16/9536; G06F 16/9538
See application file for complete search history.

(56) References Cited

U.S. PATENT DOCUMENTS

| | | |
|---|---|---|
| 7,007,242 B2 | 2/2006 | Suomela et al. |
| 7,328,216 B2 | 2/2008 | Hofmann et al. |
| (Continued) | | |

FOREIGN PATENT DOCUMENTS

| | | |
|---|---|---|
| CN | 103077220 A | 5/2013 |
| CN | 103167330 A | 6/2013 |
| (Continued) | | |

OTHER PUBLICATIONS

Office Action with regard to the counterpart U.S. Appl. No. 16/010,152 dated Apr. 7, 2020.
(Continued)

*Primary Examiner* — Amanda L Willis
(74) *Attorney, Agent, or Firm* — BCF LLP

(57) ABSTRACT

A method and system for determining user-specific proportions of types of content for recommendation to a given user comprising: acquiring for each respective type of content of at least two types of content, a respective base interval of proportion of content for recommendation, computing for each respective type of content of the at least two types of content an associated respective distribution of user interaction parameters associated with a respective set of users, acquiring an associated respective user-specific interaction parameter of the given user, computing for each respective type of content a respective user-specific proportion of the respective type of content for content recommendation to the given user, the respective user-specific proportion being within the respective base interval of proportion of content, the computing being based on: the respective distribution of user interaction parameters of the set of users, and the respective user-specific interaction parameter of the given user.

28 Claims, 8 Drawing Sheets

(56) References Cited

U.S. PATENT DOCUMENTS

| | | |
|---|---|---|
| 7,451,173 B1 | 11/2008 | Van et al. |
| 7,502,789 B2 | 3/2009 | Yao et al. |
| 7,540,051 B2 | 6/2009 | Gundersen et al. |
| D607,463 S | 1/2010 | Krieter et al. |
| 7,685,200 B2 | 3/2010 | Gunawardena et al. |
| 7,685,232 B2 | 3/2010 | Gibbs et al. |
| D613,300 S | 4/2010 | Chaudhri |
| 7,849,076 B2 | 12/2010 | Zheng et al. |
| 8,010,527 B2 | 8/2011 | Denoue et al. |
| 8,225,195 B1 | 7/2012 | Bryar et al. |
| 8,244,740 B2 | 8/2012 | Gruenhagen et al. |
| 8,271,898 B1 | 9/2012 | Mattos et al. |
| 8,285,602 B1 | 10/2012 | Yi et al. |
| 8,290,818 B1 | 10/2012 | Levitan et al. |
| 8,296,179 B1 | 10/2012 | Rennison |
| 8,301,623 B2 | 10/2012 | Chakrabarti et al. |
| 8,386,955 B1 | 2/2013 | Weber et al. |
| 8,412,726 B2 | 4/2013 | Yan et al. |
| 8,429,184 B2 | 4/2013 | Ismalon |
| D682,844 S | 5/2013 | Friedlander et al. |
| 8,478,664 B1 | 7/2013 | Xavier et al. |
| 8,478,750 B2 | 7/2013 | Rao et al. |
| 8,510,252 B1 | 8/2013 | Gargi et al. |
| D691,619 S | 10/2013 | Satterfield et al. |
| 8,554,601 B1 | 10/2013 | Marsh et al. |
| D693,833 S | 11/2013 | Inose et al. |
| 8,583,418 B2 | 11/2013 | Silverman et al. |
| 8,600,968 B2 | 12/2013 | Holenstein et al. |
| 8,606,792 B1 | 12/2013 | Jackson et al. |
| 8,655,829 B2 | 2/2014 | Flinn et al. |
| 8,676,736 B2 | 3/2014 | Pilaszy et al. |
| 8,683,374 B2 | 3/2014 | Vaughan et al. |
| 8,712,937 B1 | 4/2014 | Bacus et al. |
| 8,751,507 B2 | 6/2014 | Kim et al. |
| 8,869,042 B2 | 10/2014 | Kast |
| 8,886,797 B2 | 11/2014 | Gannu et al. |
| 8,893,042 B2 | 11/2014 | Laurie et al. |
| 8,893,043 B2 | 11/2014 | Dodson et al. |
| 8,903,834 B2 | 12/2014 | Ciancutti et al. |
| 8,910,070 B2 | 12/2014 | Goodger et al. |
| 8,914,399 B1 | 12/2014 | Paleja et al. |
| 8,935,258 B2 | 1/2015 | Svore et al. |
| 8,972,391 B1 * | 3/2015 | McDonnell ............ G06F 16/337 707/727 |
| 8,972,865 B2 | 3/2015 | Hansen et al. |
| 8,983,888 B2 | 3/2015 | Nice et al. |
| 8,996,530 B2 | 3/2015 | Luvogt et al. |
| 9,053,416 B1 | 6/2015 | De Leo et al. |
| D733,747 S | 7/2015 | Jeong et al. |
| 9,098,248 B2 | 8/2015 | Suzuki et al. |
| 9,098,551 B1 | 8/2015 | Fryz et al. |
| 9,122,989 B1 | 9/2015 | Morris et al. |
| D751,570 S | 3/2016 | Lee et al. |
| D751,571 S | 3/2016 | Lee et al. |
| D751,572 S | 3/2016 | Lee et al. |
| D752,601 S | 3/2016 | Lam |
| D752,636 S | 3/2016 | Yoon et al. |
| 9,317,498 B2 | 4/2016 | Baker et al. |
| D755,805 S | 5/2016 | Zankowski et al. |
| D755,806 S | 5/2016 | Zankowski et al. |
| D755,832 S | 5/2016 | Liu et al. |
| D757,788 S | 5/2016 | Shrivastava |
| 9,348,898 B2 | 5/2016 | Nice et al. |
| 9,396,258 B2 | 7/2016 | Chu et al. |
| 9,405,741 B1 | 8/2016 | Schaaf et al. |
| D766,274 S | 9/2016 | Che et al. |
| 9,471,671 B1 | 10/2016 | Juang et al. |
| 9,473,803 B2 | 10/2016 | Wang |
| 9,569,785 B2 | 2/2017 | Alon et al. |
| 9,582,767 B2 | 2/2017 | Somekh et al. |
| 9,660,947 B1 | 5/2017 | Hart |
| 9,703,783 B2 | 7/2017 | Yi et al. |
| 9,785,883 B2 | 10/2017 | Luvogt et al. |
| 9,836,533 B1 | 12/2017 | Levi et al. |
| 9,836,765 B2 | 12/2017 | Hariri et al. |
| 9,846,836 B2 | 12/2017 | Gao et al. |
| D806,723 S | 1/2018 | Gussev et al. |
| 9,900,659 B1 | 2/2018 | Norum et al. |
| 9,916,613 B1 | 3/2018 | Dorner et al. |
| 10,003,924 B2 | 6/2018 | Volozh et al. |
| 10,051,304 B2 | 8/2018 | Tidwell et al. |
| D828,369 S | 9/2018 | Arutyunyan et al. |
| 10,102,559 B1 | 10/2018 | Jain et al. |
| 10,114,901 B2 | 10/2018 | Mitrovic |
| 10,149,958 B1 | 12/2018 | Tran et al. |
| 10,242,259 B2 | 3/2019 | Hagelin |
| D847,163 S | 4/2019 | Matsumura |
| 10,909,576 B1 | 2/2021 | Arivukkarasu et al. |
| 11,074,495 B2 | 7/2021 | Zadeh et al. |
| 2002/0054164 A1 | 5/2002 | Uemura |
| 2002/0198882 A1 | 12/2002 | Linden et al. |
| 2004/0158497 A1 | 8/2004 | Brand |
| 2004/0260621 A1 | 12/2004 | Foster et al. |
| 2005/0076365 A1 | 4/2005 | Popov et al. |
| 2005/0086110 A1 | 4/2005 | Haley et al. |
| 2005/0097190 A1 | 5/2005 | Abdelhak |
| 2006/0031114 A1 | 2/2006 | Zommers |
| 2006/0041548 A1 | 2/2006 | Parsons et al. |
| 2006/0293065 A1 | 12/2006 | Chew et al. |
| 2008/0134043 A1 | 6/2008 | Georgis et al. |
| 2008/0222132 A1 | 9/2008 | Pan et al. |
| 2008/0243733 A1 | 10/2008 | Black |
| 2008/0250039 A1 | 10/2008 | Franks et al. |
| 2008/0256017 A1 | 10/2008 | Murakami |
| 2008/0266289 A1 | 10/2008 | Park |
| 2008/0281711 A1 | 11/2008 | Bridges et al. |
| 2008/0294617 A1 | 11/2008 | Chakrabarti et al. |
| 2009/0006371 A1 | 1/2009 | Denoue |
| 2009/0006373 A1 | 1/2009 | Chakrabarti et al. |
| 2009/0006398 A1 | 1/2009 | Lam et al. |
| 2009/0055385 A1 | 2/2009 | Jeon et al. |
| 2009/0150935 A1 | 6/2009 | Peters et al. |
| 2009/0163183 A1 | 6/2009 | O'Donoghue et al. |
| 2009/0199113 A1 | 8/2009 | McWhinnie et al. |
| 2009/0249217 A1 | 10/2009 | Narayanaswami |
| 2009/0276368 A1 | 11/2009 | Martin et al. |
| 2009/0327941 A1 | 12/2009 | Fong et al. |
| 2010/0050067 A1 | 2/2010 | Curwen et al. |
| 2010/0070454 A1 | 3/2010 | Masuda et al. |
| 2010/0070928 A1 | 3/2010 | Goodger et al. |
| 2010/0082422 A1 | 4/2010 | Heilig et al. |
| 2010/0131844 A1 | 5/2010 | Wohlert |
| 2010/0175018 A1 | 7/2010 | Petschnigg et al. |
| 2010/0205542 A1 | 8/2010 | Walman |
| 2010/0241597 A1 * | 9/2010 | Chen ..................... G06Q 30/02 706/12 |
| 2010/0251304 A1 | 9/2010 | Donoghue et al. |
| 2010/0312650 A1 | 12/2010 | Pinckney et al. |
| 2010/0312724 A1 | 12/2010 | Pinckney et al. |
| 2011/0029636 A1 | 2/2011 | Smyth et al. |
| 2011/0035388 A1 | 2/2011 | Im et al. |
| 2011/0047136 A1 | 2/2011 | Dehn |
| 2011/0047491 A1 | 2/2011 | Hwang et al. |
| 2011/0066497 A1 | 3/2011 | Gopinath et al. |
| 2011/0072011 A1 | 3/2011 | Qiao |
| 2011/0072013 A1 | 3/2011 | Mosoi et al. |
| 2011/0107223 A1 | 5/2011 | Tilton et al. |
| 2011/0112981 A1 | 5/2011 | Park et al. |
| 2011/0125763 A1 | 5/2011 | Takanen et al. |
| 2011/0179081 A1 | 7/2011 | Ovsjanikov et al. |
| 2011/0208732 A1 | 8/2011 | Melton et al. |
| 2011/0213761 A1 | 9/2011 | Song et al. |
| 2011/0246406 A1 | 10/2011 | Lahav et al. |
| 2011/0252050 A1 | 10/2011 | Palleti et al. |
| 2011/0258185 A1 | 10/2011 | Acharya et al. |
| 2011/0302117 A1 | 12/2011 | Pinckney et al. |
| 2011/0302158 A1 | 12/2011 | Sanders |
| 2011/0320450 A1 | 12/2011 | Liu et al. |
| 2012/0030159 A1 | 2/2012 | Pilaszy et al. |
| 2012/0054794 A1 | 3/2012 | Kim et al. |
| 2012/0059707 A1 | 3/2012 | Goenka et al. |
| 2012/0143871 A1 | 6/2012 | Liebald et al. |
| 2012/0158685 A1 | 6/2012 | White et al. |
| 2012/0159337 A1 | 6/2012 | Travilla et al. |

(56) References Cited

U.S. PATENT DOCUMENTS

| | | |
|---|---|---|
| 2012/0191776 A1 | 7/2012 | Ruffner et al. |
| 2012/0209907 A1 | 8/2012 | Andrews et al. |
| 2012/0254097 A1 | 10/2012 | Flinn et al. |
| 2012/0278767 A1 | 11/2012 | Stibel et al. |
| 2012/0288153 A1 | 11/2012 | Tojo et al. |
| 2012/0304073 A1 | 11/2012 | Mandic et al. |
| 2012/0317104 A1 | 12/2012 | Radlinski et al. |
| 2012/0323349 A9 | 12/2012 | Khedouri et al. |
| 2013/0009990 A1 | 1/2013 | Hsu et al. |
| 2013/0024471 A1 | 1/2013 | Mitrovic |
| 2013/0031090 A1 | 1/2013 | Posse et al. |
| 2013/0041896 A1 | 2/2013 | Ghani et al. |
| 2013/0046772 A1 | 2/2013 | Gu et al. |
| 2013/0047112 A1 | 2/2013 | Waeller |
| 2013/0073988 A1 | 3/2013 | Groten et al. |
| 2013/0080968 A1 | 3/2013 | Hanson et al. |
| 2013/0085871 A1 | 4/2013 | Goss et al. |
| 2013/0111395 A1 | 5/2013 | Ying et al. |
| 2013/0132515 A1 | 5/2013 | Mostafa et al. |
| 2013/0158693 A1 | 6/2013 | Beckmann et al. |
| 2013/0159243 A1 | 6/2013 | Wei et al. |
| 2013/0179252 A1 | 7/2013 | Dong et al. |
| 2013/0194308 A1 | 8/2013 | Privault et al. |
| 2013/0204737 A1 | 8/2013 | Agarwal et al. |
| 2013/0227054 A1 | 8/2013 | Zhang et al. |
| 2013/0241952 A1 | 9/2013 | Richman et al. |
| 2013/0262478 A1 | 10/2013 | Kemp et al. |
| 2013/0290110 A1 | 10/2013 | Luvogt et al. |
| 2013/0290905 A1 | 10/2013 | Luvogt et al. |
| 2013/0297698 A1 | 11/2013 | Odero et al. |
| 2013/0311408 A1 | 11/2013 | Bagga et al. |
| 2013/0346182 A1 | 12/2013 | Cheng et al. |
| 2013/0346234 A1 | 12/2013 | Hendrick et al. |
| 2013/0346545 A1 | 12/2013 | Petersen et al. |
| 2014/0006399 A1 | 1/2014 | Vasudevan et al. |
| 2014/0025532 A1 | 1/2014 | Huang et al. |
| 2014/0025609 A1 | 1/2014 | Coster et al. |
| 2014/0032678 A1 | 1/2014 | Koukoumidis et al. |
| 2014/0040776 A1 | 2/2014 | Dann et al. |
| 2014/0074856 A1 | 3/2014 | Rao et al. |
| 2014/0095967 A1 | 4/2014 | Cheng et al. |
| 2014/0100835 A1 | 4/2014 | Majumdar et al. |
| 2014/0101142 A1 | 4/2014 | Gomez et al. |
| 2014/0101192 A1 | 4/2014 | Sabah et al. |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1 | 7/2014 | Joo et al. |
| 2014/0207622 A1 | 7/2014 | Vijayaraghavan et al. |
| 2014/0250390 A1 | 9/2014 | Holmes et al. |
| 2014/0278308 A1 | 9/2014 | Liu et al. |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2014/0380219 A1 | 12/2014 | Cartan |
| 2015/0006286 A1 | 1/2015 | Liu et al. |
| 2015/0039406 A1 | 2/2015 | Dubey et al. |
| 2015/0052003 A1 | 2/2015 | Tang et al. |
| 2015/0058264 A1 | 2/2015 | Hughes et al. |
| 2015/0066643 A1 | 3/2015 | Choi et al. |
| 2015/0088921 A1 | 3/2015 | Somaiya et al. |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0169557 A1 | 6/2015 | Ciordas et al. |
| 2015/0178282 A1 | 6/2015 | Gorur et al. |
| 2015/0189070 A1 | 7/2015 | Baker |
| 2015/0220835 A1 | 8/2015 | Wilson et al. |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1 | 11/2015 | Cho et al. |
| 2015/0331859 A1 | 11/2015 | Raichelgauz et al. |
| 2015/0331951 A1 | 11/2015 | Wang et al. |
| 2015/0347358 A1 | 12/2015 | Shultz et al. |
| 2015/0347920 A1 | 12/2015 | Medlock et al. |
| 2015/0370798 A1 | 12/2015 | Ju et al. |
| 2015/0378707 A1 | 12/2015 | Park et al. |
| 2015/0379146 A1 | 12/2015 | Tonse et al. |
| 2016/0004394 A1 | 1/2016 | Macadaan et al. |
| 2016/0019581 A1 | 1/2016 | Wu et al. |
| 2016/0021179 A1 | 1/2016 | James et al. |
| 2016/0055242 A1 | 2/2016 | Bradic et al. |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0117397 A1 | 4/2016 | Bansal et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0188739 A1 | 6/2016 | Tang et al. |
| 2016/0196244 A1 | 7/2016 | Greenberg et al. |
| 2016/0210289 A1 | 7/2016 | Esinovskaya et al. |
| 2016/0239871 A1 | 8/2016 | Yu et al. |
| 2016/0259790 A1 | 9/2016 | Mashiach et al. |
| 2016/0274744 A1 | 9/2016 | Neumann et al. |
| 2016/0275804 A1 | 9/2016 | Koppel et al. |
| 2016/0283481 A1 | 9/2016 | Morley et al. |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0011409 A1 | 1/2017 | Eager et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0053646 A1 | 2/2017 | Watanabe et al. |
| 2017/0060870 A1 | 3/2017 | Checkley |
| 2017/0060872 A1 | 3/2017 | Sacheti et al. |
| 2017/0061014 A1 | 3/2017 | Heiler et al. |
| 2017/0061286 A1 | 3/2017 | Kumar et al. |
| 2017/0068992 A1 | 3/2017 | Chen et al. |
| 2017/0076318 A1 | 3/2017 | Goswami et al. |
| 2017/0083965 A1 | 3/2017 | Sun |
| 2017/0091194 A1* | 3/2017 | Spiegel ............... G06F 16/2465 |
| 2017/0103343 A1 | 4/2017 | Yee et al. |
| 2017/0124093 A1 | 5/2017 | Carbonell et al. |
| 2017/0132230 A1 | 5/2017 | Muralidhar et al. |
| 2017/0161773 A1 | 6/2017 | Xu et al. |
| 2017/0293865 A1 | 10/2017 | Sandler |
| 2017/0337612 A1 | 11/2017 | Galron et al. |
| 2018/0011937 A1 | 1/2018 | Tikhonov |
| 2018/0012236 A1 | 1/2018 | Zhuo et al. |
| 2018/0014038 A1 | 1/2018 | Lamburt et al. |
| 2018/0020258 A1 | 1/2018 | Jeon et al. |
| 2018/0049001 A1 | 2/2018 | Volozh et al. |

(56) References Cited

U.S. PATENT DOCUMENTS

| | | |
|---|---|---|
| 2018/0075137 A1 | 3/2018 | Lifar |
| 2018/0096388 A1 | 4/2018 | Lu |
| 2018/0204111 A1 | 7/2018 | Zadeh et al. |
| 2018/0336183 A1 | 11/2018 | Lee et al. |
| 2018/0365562 A1 | 12/2018 | Volkova |
| 2019/0034432 A1 | 1/2019 | Rybalchenko et al. |
| 2019/0060602 A1 | 2/2019 | Tran et al. |
| 2019/0069030 A1 | 2/2019 | Jackman et al. |
| 2019/0130296 A1 | 5/2019 | Basu et al. |
| 2019/0236448 A1 | 8/2019 | Piatt |
| 2019/0342616 A1 | 11/2019 | Domm et al. |
| 2020/0007936 A1 | 1/2020 | Salomatin et al. |
| 2020/0090247 A1 | 3/2020 | Sokolov et al. |
| 2020/0184278 A1 | 6/2020 | Zadeh et al. |
| 2020/0202073 A1 | 6/2020 | Ghulati |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 103559262 B | 10/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |
| CN | 107577682 A | 1/2018 |
| CN | 104903889 B | 5/2018 |
| CN | 108346072 A | 7/2018 |
| EP | 3032780 A | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2417419 C2 | 4/2011 |
| RU | 2417437 C2 | 4/2011 |
| RU | 2419858 C2 | 5/2011 |
| RU | 2451986 C2 | 11/2011 |
| RU | 2481748 C2 | 5/2013 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| RU | 2580516 C2 | 4/2016 |
| RU | 2605039 C2 | 12/2016 |
| RU | 2629449 C2 | 8/2017 |
| RU | 2632100 C2 | 10/2017 |
| RU | 2632132 C2 | 10/2017 |
| RU | 2632138 C2 | 10/2017 |
| RU | 2660602 C1 | 7/2018 |
| RU | 2017101241 A | 7/2018 |
| RU | 2663478 C2 | 8/2018 |
| WO | 2002052374 A2 | 7/2002 |
| WO | 2009087414 A1 | 7/2009 |
| WO | 2013010698 A1 | 1/2013 |
| WO | 2013189738 A1 | 12/2013 |
| WO | 2014141078 A1 | 9/2014 |
| WO | 2016030702 A1 | 3/2016 |
| WO | 2019043381 A1 | 3/2019 |

OTHER PUBLICATIONS

Office Action with regard to the counterpart U.S. Appl. No. 16/503,560 dated Apr. 15, 2021.
Office Action with regard to the counterpart U.S. Appl. No. 15/607,555 dated Apr. 19, 2021.
Xiao et al., "Research and Implementation of Hybrid Recommandation Algorithm Based on Collaborative Filtering and Word2Vec", 2015 8th International Symposium on Computational Intelligence and Design, 2015 (Year: 2015).
Koren et al., "Matrix Factorization Techniques for Recommander Systems", IEEE Computer, vol. 42, Issue 8, Aug. 2009 (Year: 2009).
Search Report with regard to the counterpart RU Patent Application 2017140972 completed May 13, 2019.
Office Action with regard to the counterpart U.S. Appl. No. 16/010,152 dated Apr. 2, 2021.
Office Action with regard to the counterpart U.S. Appl. No. 16/009,929 dated Mar. 16, 2021.
"Browser Amigo by Mail.ru", https://www.youtube.com/watch?v=9IPOwpplcWM accessed on Mar. 9, 2020; https://www.youtube.com/watch?v=vdxnXZT2tQo accessed on Mar. 9, 2020, pdf 7 pages.
Search Report with regard to the counterpart RU Patent Application No. 2018132708 completed Feb. 18, 2020.
Search Report with regard to the counterpart RU Patent Application No. 2018132713 completed Feb. 21, 2020.
English Abstract for RU2017101241 retrieved on Espacenet on Mar. 12, 2020.
English Abstract for CN107577682 retrieved on Espacenet on Mar. 12, 2020.
English Abstract for CN108346072 retrieved on Espacenet on Mar. 12, 2020.
Office Action with regard to the U.S. Appl. No. 16/371,624 dated Jul. 7, 2021.
Office Action with regard to the counterpart U.S. Appl. No. 15/607,555 dated Jun. 11, 2021.
Notice of Allowance with regard to the U.S. Appl. No. 16/503,560 dated Jun. 8, 2021.
Levy et al., "Neural Ward Embedding as Implicit Matrix Factorization", Advances in Neural Information Processing, 2014, p. 2177-2185 (Year: 2014)—cited in the Office Action with regard to the counterpart U.S. Appl. No. 15/607,555 dated Jun. 11, 2021.
Office Action with regard to the counterpart U.S. Appl. No. 16/371,624 dated Dec. 9, 2020.
Notice of Allowance received with regard to the counterpart U.S. Appl. No. 29/590,781 dated Dec. 20, 2019.
Search Report with regard to the counterpat RU Patent Application No. 2018132716 completed Nov. 25, 2019.
English abstract of CN 103838842 retrieved from Espacenet on Feb. 3, 2017.
Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.
Mozilla / newnewtab, https://github.com/mozilla/newnewtab, retrieved on Nov. 11, 2016, 2 pages.
Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.
Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.
Opera Help, Speed Dial, http://help.opera.com/Windows/12.10/en/speeddial.html, retrieved on Nov. 11, 2016, 2 pages.
Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.
Russian Search Report from RU patent application No. 2015141291 dated Nov. 2, 2016.
Extended European Search Report from EP16190997, dated Feb. 16, 2017, Herry, Tzvetanka.

(56) References Cited

OTHER PUBLICATIONS

European Search report from EP 16185747, Siodmok, Wojciech, dated Jan. 18, 2017.
English abstract of CN103678672 retrieved from Espacenet on Jan. 20, 2017.
English abstract of CN103077220 retrieved from Espacenet on Jan. 20, 2017.
Russian Search Report dated Nov. 9, 2016 from Russian Patent Application No. 2015136684.
Amatriain et al., System Architectures for Personalization and Recommendation, http://techblog.netflix.com/2013/03/system-architectures-for.html, retrieved on May 30, 2015.
English Abstract of CN303532062 retrieved on Google Translate on Apr. 4, 2017.
Kumar et al., "Knowledge Retrieval from Web Server Logs Using Web Usage Mining", International Journal of Science and Research (IJSR), 2015, vol. 4, Issue 3, pp. 2173-2176.
Kim et al., "Ranking Web Documents with Dynamic Evaluation by Expert Groups", J. Eder and M. Missikoff (Eds.), Caise, 2003, pp. 437-448.
Russian Search Report from RU patent application No. 2016127447 dated Feb. 7, 2017.
Pilaszy et al., "Fast ALS-based Matrix Factorization for Explicit and Implicit Feedback Datasets", RECSYS'10, 2010, pp. 71-78.
U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/262,332, filed Sep. 12, 2016.
Design U.S. Appl. No. 29/590,781, filed Jan. 13, 2017.
U.S. Appl. No. 15/592,745, filed May 11, 2017.
U.S. Appl. No. 15/606,326, filed May 26, 2017.
U.S. Appl. No. 15/606,658, filed May 26, 2017.
U.S. Appl. No. 15/607,555, filed May 29, 2017.
Russian Search Report from RU patent application No. 2015141108 dated Sep. 7, 2016.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
YouTube Account: RnStore, "Zmags Demo", (May 19, 2011 ), times stamp 1:54/3:56, 2:20/3:56, PDF Attached, URL: https://www.youtube.com/watch?v=AsBrLdoEJgA, with regard to the U.S. Appl. No. 15/263,493.
YouTube Account: iappletech128, "Close Tabs in Safari by Swiping", (Oct. 20, 2013), time stamp 0:20-0:35/1 :18, PDF Attached, URL: https://www.youtube.com/watch?v=V8TTbYrFSmg, with regard to the U.S. Appl. No. 15/263,493.
YouTube Account: macmostvideo, "Viewing Photos With the Finder (MacMost Now 612)", (Sep. 30, 2011 ), time stamp 2:05-2:25, PDF Attached, URL: https://www.youtube.com/watch?v=tYoJI6G7Hkg, with regard to the U.S. Appl. No. 15/263,493.
European Examination Report with regard to the counterpart patent application No. EP 16190999.9 dated Jun. 29, 2018.
U.S. Appl. No. 16/010,152, filed Jun. 15, 2018.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages (in the Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (in the Notice of Allowance with regard to the counterpart U.S. Appl. No. 15/592,745 dated Oct. 11, 2018).
U.S. Appl. No. 16/009,929, filed Jun. 15, 2018.
Search Report with regard to the counterpart RU Patent Application No. 2018135362 completed Mar. 26, 2020.
English Abstract for CN104903889 retrieved on Espacenet on Apr. 16, 2020.
Notice of Allowance with regard to the counterpart U.S. Appl. No. 16/370,286 dated Mar. 31, 2020.
Notice of Allowance received with regard to the counterpart U.S. Appl. No. 15/606,658 dated Jun. 26, 2019.
English Abstract for CN104317835 retrieved on Espacenet on May 7, 2018.
English Abstract for CN105893398 retrieved on Espacenet on May 7, 2018.
English Abstract for CN106446195 retrieved on Espacenet on May 7, 2018.
English Abstract for KR20160064447 retrieved on Espacenet on May 7, 2018.
English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
English Abstract for CN103473354 retrieved on Espacenet on Jan. 4, 2019.
English Abstract for JP2009015834 retrieved on Espacenet on Mar. 21, 2019.
Notice of Allowance with regard to the counterpart U.S. Appl. No. 15/262,332 dated Mar. 18, 2019.
Office Action with regard to the counterpart U.S. Appl. No. 15/592,745 dated Mar. 8, 2019.
Office Action with regard to the counterpart U.S. Appl. No. 15/262,318 dated Apr. 1, 2019.
U.S. Appl. No. 16/370,286, filed Mar. 29, 2019.
U.S. Appl. No. 16/371,624, filed Apr. 1, 2019.
Office Action with regard to the counterpart U.S. Appl. No. 15/263,493 dated May 9, 2019.
Martin Beck, "Facebook Now Asks Why You're Hiding That Ad, To Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
Search Report with regard to the counterpart RU Patent Application No. 2018135455 completed May 22, 2020.

(56) References Cited

OTHER PUBLICATIONS

Office Action with regard to the counterpart U.S. Appl. No. 15/607,555 dated Aug. 17, 2021.
Office Action with regard to the counterpart U.S. Appl. No. 16/009,929 dated Aug. 2, 2021.
Menczer, "Fake Online News Spreads Through Social Echo Chambers", The Conversation, Computing, ScientificAmerican.com, Nov. 28, 2016, pp. 1-10.
Office Action with regard to the U.S. Appl. No. 16/503,546 dated Oct. 4, 2021.
Office Action with regard to the U.S. Appl. No. 16/934,288 dated Nov. 12, 2021.
Office Action with regard to the U.S. Appl. No. 16/009,929 dated Dec. 3, 2021.
Jamali, Mohsen et. al., "TrustWalker: A Random Walk Madel for Combining Trust-based and Item-based Recommendation." KDD'09, Jun. 28-Jul. 1, 2009, Paris, France. (Year: 2009).
Notice of Allowance with regard to the U.S. Appl. No. 16/371,624 dated Jan. 20, 2022.
"The impact of ad positioning in search engine targeting: a multi-faceted decision problem," by Carsten D. Schultz, Electronic Commerce Research, New York: Springer Nature B.V., Jun. 29, 2018 (Year: 2018).
"Identify, Match, and Target-Penton's Audience-Based Targeting Reaches the Right Individual, Audience, or Company to Accelerate Marketing Programs," PR Newswire, PR Newswire Associated LLC, Aug. 11, 2016 (Year: 2016).

\* cited by examiner

METHOD OF AND SYSTEM FOR DETERMINING USER-SPECIFIC PROPORTIONS OF CONTENT FOR RECOMMENDATION

CROSS-REFERENCE

The present application claims priority to Russian Patent Application No. 2018132713, entitled "Method Of And System For Determining User-Specific Proportions Of Content For Recommendation," filed on Sep. 14, 2018, the entirety of which is incorporated herein by reference.

FIELD

The present technology relates to recommendation systems in general and, specifically, to a method and a system for determining user-specific proportions of content for recommendation to a given user of a recommendation system.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the tanked list of search results).

The search engines typically provide a good search tool for a search query that the user knows a priori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD™ recommending system, which system aggregates and recommends content from various social networks. The FLIPBOARD™ recommending system presents the uncovered content in a "magazine style" format, where the user can "flip" through the pages with the recommended/aggregated content. The recommending system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

Typically, recommendation systems provide personalized content to users based on previous user interactions with the recommendation service that can be indicative of user preferences for some particular content rather than other content. For example, if some particular content is associated with a large amount of previous user interactions, this particular content is more likely to be provided as personalized content since a large amount of previous user interactions may be indicative of relevant content.

United States Patent Application Publication No. 2017/0068992 A1 published on Mar. 9, 2017 to Yahoo! Inc. and titled "MULTI-SOURCE CONTENT BLENDING" teaches a method and apparatus for multi-source content blending.

United States Patent Application Publication No. 2011/0302158 A1 published on Dec. 8, 2011 to Netflix Inc. and titled "Interest based row selection" teaches a mechanism for recommending genres and associated digital items to a user. Genres that are of interest to the user are determined based on user preferences gathered implicitly or explicitly. The genres are then scored and sorted based on different scoring and sorting techniques. A subset of the scored and sorted genres is then selected for recommending to the user.

United States Patent Application Publication No. 2010/0131844 A1 published on May 27, 2010 to AT&T INTELLECTUAL PROPERTY and titled "Systems and methods to select media content" teaches a systems and methods to select media content. A particular method includes generating a media playlist based on user preference data and generating a user interface display. The user preference data indicates proportions of each of a plurality of categories of media content to be present in the media playlist. The user interface display presents the user preference data using adjustable bars. Each bar is associated with one of the categories of media content, and a dimension of each bar is associated with the proportion of the respective category of media content included in the media playlist. The method includes receiving user input adjusting the dimension of a first bar associated with a first category of the plurality of categories of media content. The method includes adjusting the proportion of the first category of media content included in the media playlist based on the user input.

United States Patent Application Publication No. 2016/0328480 A1 published on Nov. 10, 2016 to Facebook Inc. and titled "Systems and methods for tuning content provision based on user preference" teaches systems, methods, and non-transitory computer readable media configured to prompt a user to provide an indication of a desired frequency with which to receive content items reflecting a topic. The indication of the desired frequency can be received. A selection of the content items reflecting the topic can be tuned for presentation to the user based on the desired frequency.

SUMMARY

Developers of the present technology have appreciated certain technical drawbacks associated with the existing recommendation systems. Conventional recommendation systems usually use past user interactions with items as basis for determining relevance of these items to users of a recommendation service. These conventional recommendation systems are based on the assumption that users often viewing and/or often interacting with content items is indicative of a high relevance of these items to the users. However, in some cases, this assumption may be flawed for various reasons.

It is an object of the present technology to ameliorate at least some of the inconveniences present in the prior art.

According to a first broad aspect of the present technology, there is provided a computer-implemented method for determining user-specific proportions of types of content for recommendation to a given user, the given user being associated with an electronic device, the electronic device being connected to a server over a communication network, the server hosting a content recommendation service, the content recommendation service for generating content recommendations having content items of at least two types, the method executable by the server, the method comprising: acquiring, by the server, for each respective type of content of the at least two types of content, an indication of a respective base interval of proportion of content for recommendation, acquiring, by the server, for each respective type of content of the at least two types of content, a respective set of user interaction parameters, the respective set of user interaction parameters being indicative of user engagement of a respective set of users of the content recommendation service with the respective type of content, computing, by the server, for each respective type of content of the at least two types of content, an associated respective distribution of user interaction parameters based on the respective set of user interaction parameters of the respective set of users, in response to receiving an indication of a personalized content request from the electronic device associated with the given user: acquiring, by the server, for each respective type of content of the at least two types of content, an associated respective user-specific interaction parameter of the given user, the associated respective user-specific interaction parameter being indicative of user preference of the given user for the respective type of content, computing, by the server, for each respective type of content of the at least two types of content, a respective user-specific proportion of the respective type of content for content recommendation to the given user, the respective user-specific proportion being within the respective base interval of proportion of content, the computing being based on: the associated respective distribution of user interaction parameters of the set of users, and the associated respective user-specific interaction parameter of the given user, generating, by the content recommendation service of the server, a plurality of content items for personalized content recommendation for the given user, the plurality of content items being of the at least two types, a respective portion of the plurality of content items being within the respective user-specific proportion, and sending, by the server, the plurality of content items for displaying on the electronic device of the given user.

In some implementations, prior to the computing the respective user-specific proportion of the respective type of content, the method further comprises: computing, by the server, a respective central distribution parameter of the associated respective distribution of user interaction parameters, determining, by the server, a respective user-specific distribution parameter of the given user, the respective user-specific distribution parameter being indicative of a location of the associated respective user-specific interaction parameter of the given user in the associated respective distribution of user interaction parameters, computing, by the server, a displacement between the respective central distribution parameter and the respective user-specific distribution parameter, and wherein the computing the respective user-specific proportion of the respective type of content is further based on: the displacement between the respective central distribution parameter and the respective user-specific distribution parameter, and a respective central proportion of the respective base interval of proportions that corresponds to the respective central distribution parameter of the associated respective distribution of user interaction parameters.

In some implementations, the computing the respective user-specific proportion of the respective type of content further comprises: determining, by the server, if a direction of the displacement between the respective central distribution parameter and the respective user-specific distribution parameter is one of: a positive direction, and a negative direction, in response to the direction being positive: assigning, by the server, a respective first predetermined value to the respective user-specific proportion, the respective first predetermined value being above the respective central proportion, and in response to the direction being negative: assigning, by the server, a respective second predetermined value to the respective user-specific proportion, the respective second predetermined value being below the respective central proportion.

In some implementations, a respective distance between the respective first predetermined value and the respective central proportion on the base interval of proportions is proportional to a magnitude of the displacement between the respective central distribution parameter and the respective user-specific distribution parameter, and a respective distance between the respective second predetermined value and the respective central proportion on the base interval of proportions is proportional to the magnitude of the displacement between the respective central distribution parameter and the respective user-specific distribution parameter.

In some implementations, the respective central distribution parameter is a median of the associated respective distribution of user interactions.

In some implementations, the respective central proportion is a median of the respective base interval of proportion.

In some implementations, the respective user-specific distribution parameter is a percentile rank of the respective user-specific interaction parameter of the given user in the respective distribution of user interaction parameters.

In some implementations, the at least two types of content include at least two of: text content, native content, non-native content, image content, video content, audio content, and weather content.

In some implementations, the respective set of user interaction parameters and the respective user-specific interaction parameter associated with the respective type of content of the at least two types of content are a same type of interaction parameter, and the method further comprises, using as the same type of interaction parameter for the respective type of content: for the text content, a click-through rate (CTR), for the native content, a click-through rate (CTR), for the non-native content, a click-through rate (CTR), for the image content, a click-through rate (CTR), for the video content, a dwell time, for the audio content, a dwell time, and for the weather content, a click-through rate (CTR).

In some implementations, the server is connected to a log database, and the acquiring the respective user-specific interaction parameter comprises: applying, by the server, a sliding window of past user interactions to user interactions associated with the given user in the log database, and computing, by the server, the respective user-specific interaction parameter based on the user interactions associated with the given user in the log database that fall within the sliding window of past user interactions.

In some implementations, further comprising, in response to a respective number of the user interactions associated with the given user that fall within the sliding window of past user interactions being below a pre-determined threshold of user interactions: assigning, by the server, a respective predetermined value to the respective user-specific proportion.

In some implementations, the method further comprises: receiving, by the server, another indication of a personalized content request from the electronic device associated with the given user after the indication of the personalized content request, determining, by the server, if a then respective number of user interactions of the given user is above the predetermined threshold of user interactions, in response to the then respective number of user interactions of the given user being above the predetermined threshold of user interactions at a time of receiving the other personalized content request: replacing, by the server, the respective predetermined value assigned to the respective user-specific proportion with a computed respective user-specific proportion.

In some implementations, the sliding window has a pre-determined size of a predefined number of past user sessions with the recommendation system.

In some implementations, the method further comprises, prior to the generating the plurality of content items: summing, by the server, the associated respective user-specific proportions to obtain a sum of user-specific proportions, in response to the sum of user-specific proportions being one of: under a predetermined summation threshold and over the predetermined summation threshold: adjusting, by the server, each of the associated respective user-specific proportions such that the sum of user-specific proportion is equal to the predetermined summation threshold.

According to a second broad aspect of the present technology, there is provided a system for determining user-specific proportions of types of content for recommendation to a given user, the given user being associated with an electronic device, the electronic device being connected to the system over a communication network, the system hosting a content recommendation service, the content recommendation service for generating content recommendations having content items of at least two types, the system comprising: a processor, a non-transitory computer-readable medium comprising instructions, the processor, upon executing the instructions, being configured to: acquire for each respective type of content of the at least two types of content, an indication of a respective base interval of proportion of content for recommendation, acquire for each respective type of content of the at least two types of content, a respective set of user interaction parameters, the respective set of user interaction parameters being indicative of user engagement of a respective set of users of the content recommendation service with the respective type of content, compute for each respective type of content of the at least two types of content, an associated respective distribution of user interaction parameters based on the respective set of user interaction parameters of the respective set of users, in response to receiving an indication of a personalized content request from the electronic device associated with the given user: acquire for each respective type of content of the at least two types of content, an associated respective user-specific interaction parameter of the given user, the associated respective user-specific interaction parameter being indicative of user preference of the given user for the respective type of content, compute for each respective type of content of the at least two types of content, a respective user-specific proportion of the respective type of content for content recommendation to the given user, the respective user-specific proportion being within the respective base interval of proportion of content, the computing being based on: the associated respective distribution of user interaction parameters of the set of users, and the associated respective user-specific interaction parameter of the given user, generate, by the content recommendation service of the system, a plurality of content items for personalized content recommendation for the given user, the plurality of content items being of the at least two types, a respective portion of the plurality of content items being within the respective user-specific proportion, and send the plurality of content items for displaying on the electronic device of the given user.

In some implementations, prior to the computing the respective user-specific proportion of the respective type of content, the processor is further configured to: compute a respective central distribution parameter of the associated respective distribution of user interaction parameters, determine a respective user-specific distribution parameter of the given user, the respective user-specific distribution parameter being indicative of a location of the associated respective user-specific interaction parameter of the given user in the associated respective distribution of user interaction parameters, compute a displacement between the respective central distribution parameter and the respective user-specific distribution parameter, and wherein the computing the respective user-specific proportion of the respective type of content is further based on: the displacement between the respective central distribution parameter and the respective user-specific distribution parameter, and a respective central proportion of the respective base interval of proportions that corresponds to the respective central distribution parameter of the associated respective distribution of user interaction parameters.

In some implementations, the computing the respective user-specific proportion of the respective type of content further comprises: determine if a direction of the displacement between the respective central distribution parameter and the respective user-specific distribution parameter is one of: a positive direction, and a negative direction, in response to the direction being positive: assign a respective first predetermined value to the respective user-specific proportion, the respective first predetermined value being above the respective central proportion, and in response to the direction being negative: assign a respective second predetermined value to the respective user-specific proportion, the respective second predetermined value being below the respective central proportion.

In some implementation, a respective distance between the respective first predetermined value and the respective central proportion on the base interval of proportions is proportional to a magnitude of the displacement between the respective central distribution parameter and the respective user-specific distribution parameter, and a respective distance between the respective second predetermined value and the respective central proportion on the base interval of proportions is proportional to the magnitude of the displacement between the respective central distribution parameter and the respective user-specific distribution parameter.

In some implementations, the respective central distribution parameter is a median of the associated respective distribution of user interactions.

In some implementations, the respective central proportion is a median of the respective base interval of proportion.

In some implementations, the respective user-specific distribution parameter is a percentile rank of the respective user-specific interaction parameter of the given user in the respective distribution of user interaction parameters.

In some implementations, the at least two types of content include at least two of: text content, native content, non-native content, image content, video content, audio content, and weather content.

In some implementations, the respective set of user interaction parameters and the respective user-specific interaction parameter associated with the respective type of content of the at least two types of content are a same type of interaction parameter, and the system further comprises, using as the same type of interaction parameter for the respective type of content: for the text content, a click-through rate (CTR), for the native content, for the non-native content, a click-through rate (CTR), for the image content, a click-through rate (CTR), a click-through rate (CTR), for the video content, a dwell time, for the audio content, a dwell time, and for the weather content, a click-through rate (CTR).

In some implementations, the system is connected to a log database, and to acquire the respective user-specific interaction parameter, the processor is further configured to: apply a sliding window of past user interactions to user interactions associated with the given user in the log database, and compute the respective user-specific interaction parameter based on the user interactions associated with the given user in the log database that fall within the sliding window of past user interactions.

In some implementations, the processor is further configured to, in response to a respective number of the user interactions associated with the given user that fall within the sliding window of past user interactions being below a pre-determined threshold of user interactions: assign a respective predetermined value to the respective user-specific proportion.

In some implementations, the processor is further configured to: receive another indication of a personalized content request from the electronic device associated with the given user after the indication of the personalized content request, determine if a then respective number of user interactions of the given user is above the predetermined threshold of user interactions, in response to the then respective number of user interactions of the given user being above the predetermined threshold of user interactions at a time of receiving the other personalized content request: replace the respective predetermined value assigned to the respective user-specific proportion with a computed respective user-specific proportion.

In some implementations, the sliding window has a predetermined size of a predefined number of past user sessions with the recommendation system.

In some implementations, the processor is further configured to, prior to the generating the plurality of content items: sum the associated respective user-specific proportions to obtain a sum of user-specific proportions, in response to the sum of user-specific proportions being one of: under a predetermined summation threshold and over the predetermined summation threshold: adjust each of the associated respective user-specific proportions such that the sum of user-specific proportion is equal to the predetermined summation threshold.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
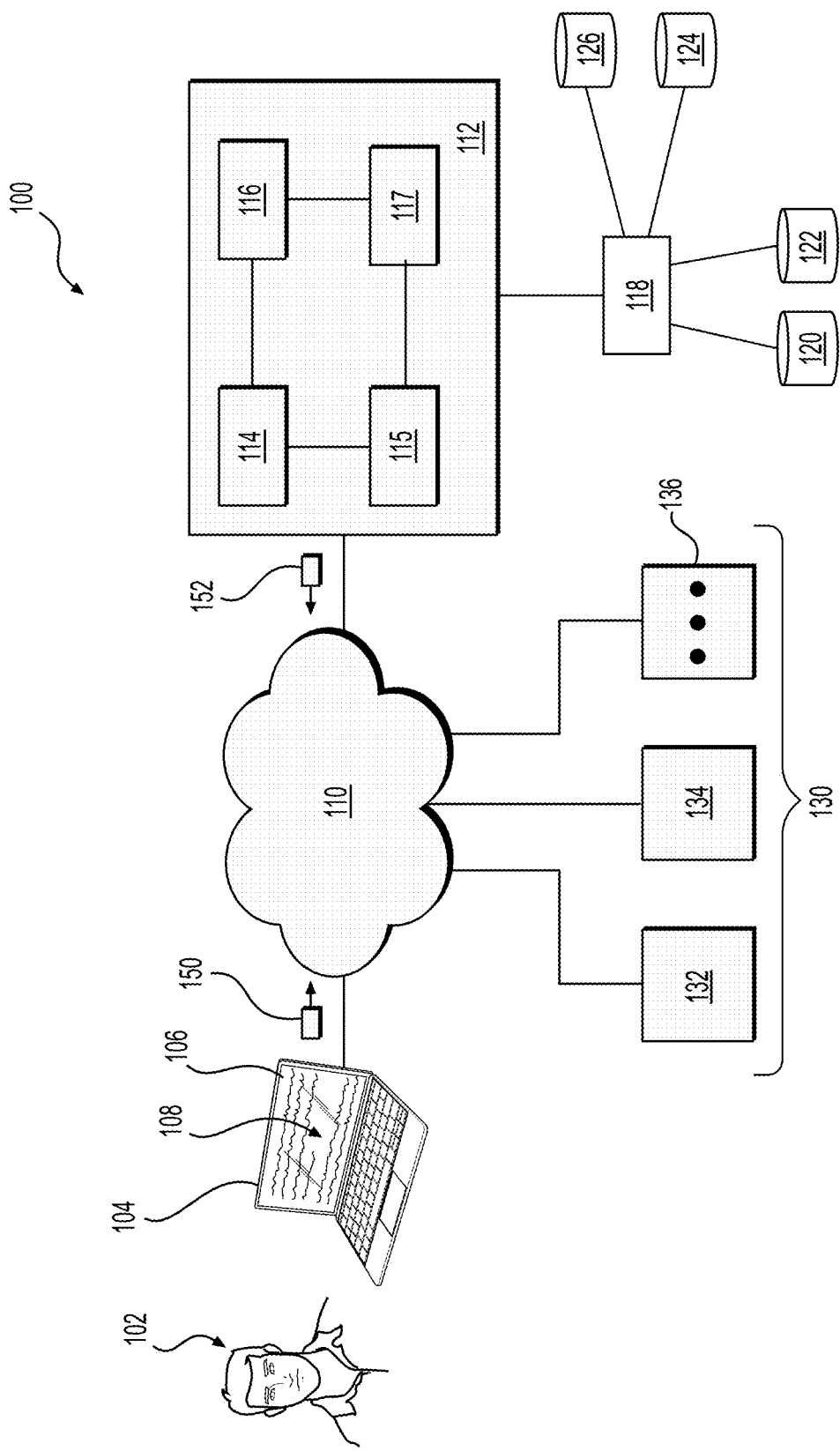
FIG. 1 depicts a system suitable for implementing non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide content recommendations to a user 102 of the system 100. The user 102 may be a subscriber to a recommendation service provided by the system 100. However, the subscription does not need to be explicit or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100" or a "training system 100"). However, embodiments of the present technology can be equally applied to other types of the systems 100, as will be described in greater detail herein below.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user to receive (or otherwise access) content recommendations provided by the system 100, as will be described in greater detail herein below.

How the recommendation application 106 is implemented is not particularly limited. One example of the recommendation application 106 may include a user accessing a web site associated with a recommendation service to access the recommendation application 106. For example, the recommendation application 106 can be accessed by typing in (or otherwise copy-pasting or selecting a link) an URL associated with the recommendation service. Alternatively, the recommendation application 106 can be an app downloaded from a so-called app store, such as APPSTORE™ or GOOGLEPLAY™ and installed/executed on the electronic device 104. It should be expressly understood that the recommendation application 106 can be accessed using any other suitable means. In yet additional embodiments, the recommendation application 106 functionality can be incorporated into another application, such as a browser application (not depicted) or the like. For example, the recommendation application 106 can be executed as part of the browser application, for example, when the user 102 first start the browser application, the functionality of the recommendation application 106 can be executed.

Figure 2:
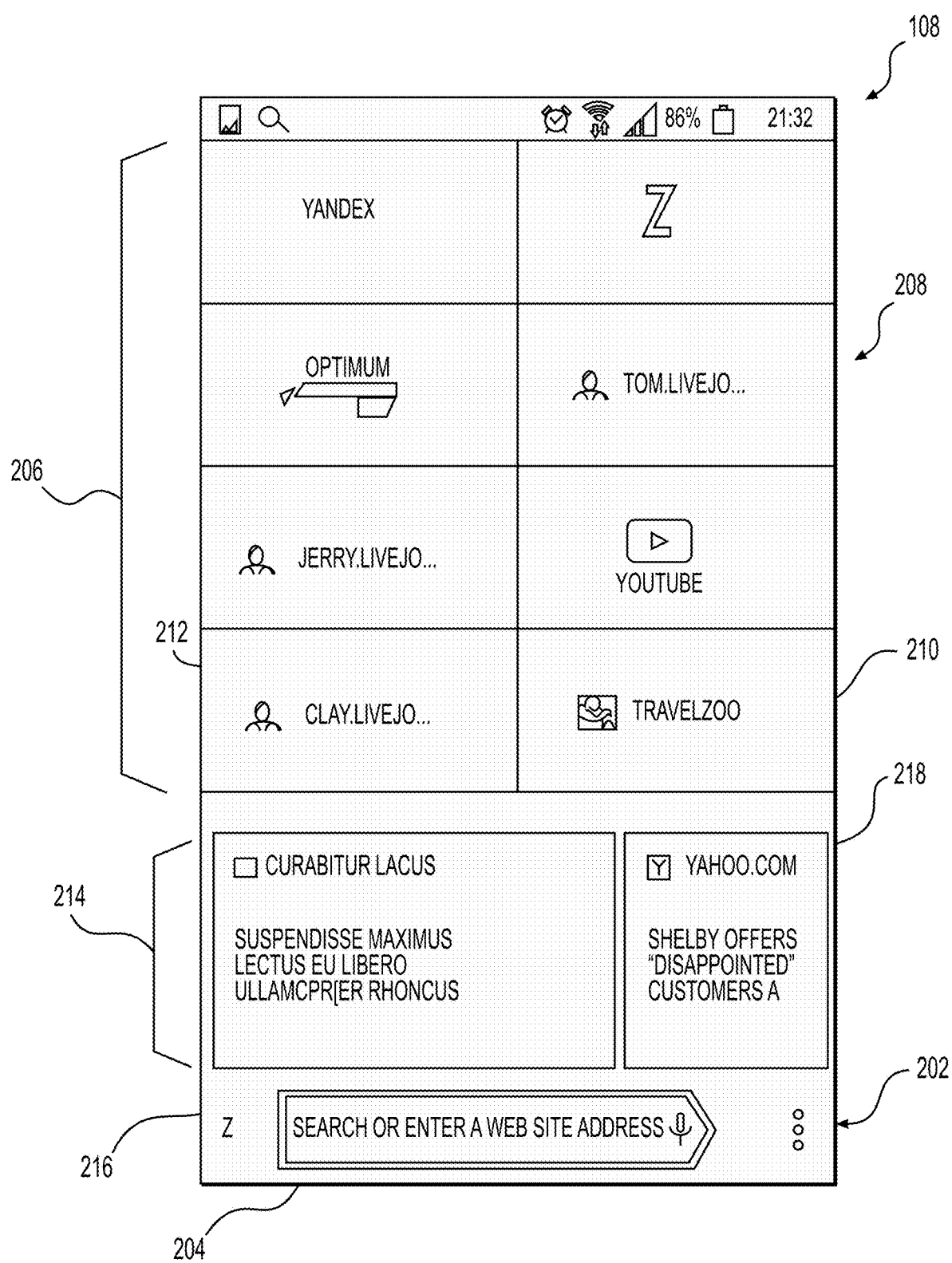
FIG. 2 depicts a screen shot of a recommendation interface implemented in accordance with a non-limiting embodiment of the present technology, the recommendation interface being depicted as displayed on the screen of an electronic device of the system of FIG. 1, the electronic device being implemented as a smart phone.

Generally speaking, the recommendation application 106 comprises a recommendation interface 108, the recommendation interface 108 being displayed on a screen (not separately numbered) of the electronic device 104. With reference to FIG. 2, there is depicted a screen shot of the recommendation interface 108 implemented in accordance with a non-limiting embodiment of the present technology (the example of the recommendation interface 108 being depicted as displayed on the screen of the electronic device 104 being implemented as a smart phone).

In some embodiments of the present technology the recommendation interface 108 is presented when the user 102 of the electronic device 104 actuates (i.e. executes, run, background-run or the like) the recommendation application 106. Alternatively, the recommendation interface 108 can be presented when the user 102 opens a new browser window and/or activates a new tab in the browser application. For example, in some embodiments of the present technology, the recommendation interface 108 can act as a "home screen" in the browser application.

The recommendation interface 108 includes a search interface 202. The search interface 202 includes a search query interface 204. The search query interface 204 can be implemented as an "omnibox" which allows entry of a search query for executing a search or a network address (such as a Universal Remote Locator) for identifying a network resource (such as a web site) to be accessed. However, the search query interface 204 can be implemented as configured to receive one or both of: entry of the search query for executing the search or the network address (such as a Universal Remote Locator) for identifying the network resource (such as a web site) to be accessed.

The recommendation interface 108 further includes a links interface 206. The links interface 206 includes a plurality of tiles 208—of which eight are depicted in FIG. 2—only two of which are numbered in FIG. 2—a first tile 210 and a second tile 212.

Using the example of the first tile 210 and the second tile 212—each of the plurality of tiles 208 includes (or acts as) a link to either (i) a web site marked as "favourite" or otherwise marked by the user 102, (ii) a previously visited web site or (iii) the like. The plurality of tiles 208, in the depicted embodiment, is visually presented to the user 102 as square buttons with a logo and/or a name of the resource depicted therein, the logo and the name for enabling the user 102 to identify which resource the particular one of the plurality of tiles (not separately numbered) is linked to. However, it should be expressly understood that the visual representation of some or all of the plurality of tiles 208 can be different. As such, some or all of the plurality of tiles 208 can be implemented as differently shaped buttons, as hyperlinks presented in a list or the like.

As an example, the first tile 210 contains a link to a TRAVELZOO™ web site and the second tile 212 contains a link to a personal live journal web site. Needless to say, the number and content of the individual ones of the plurality of tiles 208 is not particularly limited.

For example, the number of the tiles within the plurality of tiles 208 can be pre-selected by the provider of the recommendation application 106. In some embodiments of the present technology, the number of tiles within the plurality of tiles 208 is pre-selected based on the size and/or resolution of the screen of the electronic device 104 executing the recommendation application 106. For example, a first number of tiles can be pre-selected for the electronic device 104 executed as a smartphone, a second number of tiles can be pre-selected for the electronic device 104 executed as a tablet, and a third number of tiles can be pre-selected for the electronic device 104 executed as a laptop or desktop computer.

The recommendation interface 108 further includes a recommended content set 214. The recommended content set 214 includes one or more recommended content items, such as a first recommended content item 216 and a second recommended content item 218 (the second recommended content item 218 only partially visible in FIG. 2). Naturally, the recommended content set 214 can have more recommended content items. In the embodiment depicted in FIG. 2 and in those embodiments where more than one recommended content item are present, the user 102 can scroll through the recommended content set 214. The scrolling can be achieved by any suitable means. For example, the user 102 can scroll the content of the recommended content set 214 by means of actuating a mouse device (not depicted), a key board key (not depicted) or interacting with a touch sensitive screen (not depicted) of or associated with the electronic device 104.

Example provided in FIG. 2 is just one possible implementation of the recommendation interface 108. Another example of the implementation of the recommendation interface 108, as well as an explanation of how the user 102 can interact with the recommendation interface 108 is disclosed in a co-owned Russian Patent Application entitled A COMPUTER-IMPLEMENTED METHOD OF GENERATING A CONTENT RECOMMENDATION INTERFACE, filed on May 12, 2016 and bearing an application number 2016118519; content of which is incorporated by reference herein in its entirety.

How the content for the recommended content set 214 is generated will be described in greater detail herein below.

Returning to the description of FIG. 1, the electronic device 104 is communicatively coupled to a communication network 110 for accessing a recommendation server 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like. A communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

The recommendation server 112 can be implemented as a conventional computer server. In an example of an embodiment of the present technology, the recommendation server 112 can be implemented as a Dell™ PowerEdge™ Server running the Microsoft™ Windows Server™ operating system. Needless to say, the recommendation server 112 can be implemented in any other suitable hardware, software, and/or firmware, or a combination thereof. In the depicted non-limiting embodiments of the present technology, the recommendation server 112 is a single server. In alternative non-limiting embodiments of the present technology, the functionality of the recommendation server 112 may be distributed and may be implemented via multiple servers.

The recommendation server 112 comprises a processing module 114. The processing module 114 is coupled to or otherwise has access to, a content discovery module 115, an analytics module 116, and a recommended content selection module 117. The recommendation server 112 has access to a data storage device 118. Operation of the recommendation server 112 and its components will be described herein below in greater detail.

The data storage device 118 includes a main database 120, an item feature database 122, a recommendable content item database 124, and a user interaction database 126

Also coupled to the communication network 110 are a plurality of network resources 130, including a first network resource 132, a second network resource 134 and a plurality of additional network resources 136. The first network resource 132, the second network resource 134 and the plurality of additional network resources 136 are all network resources accessible by the electronic device 104 (as well as other electronic devices potentially present in the system 100) via the communication network 110. Respective content of first network resource 132, the second network resource 134 and the plurality of additional network resources 136 is not particularly limited.

A given one of the first network resource 132, the second network resource 134 and the plurality of additional network resources 136 can contain (or in other words, host) digital content (i.e. one or more digital items each of the one or more digital items having one or more types of digital content). In some embodiments of the present technology, the content of the digital items can include but is not limited to: audio content for streaming or downloading, video content for streaming or downloading, news, blogs, information about various government institutions, information about points of interest, thematically clustered content (such as content relevant to those interested in kick-boxing), other multi-media content, and the like.

In other embodiments of the present technology, the content of the digital items hosted by the first network resource 132, the second network resource 134 and the plurality of additional network resources 136 is text-based. Examples of the text-based content items include but are not limited to: news, articles, blogs, information about various government institutions, information about points of interest, thematically clustered content (such as content relevant to those interested in kick-boxing), and the like. It should be noted that "text-based" content does not intend to mean that the given digital item only contains text to the exclusion of other type of multi-media elements. On the contrary, the given text-based digital item includes text elements, as well as potentially other type of multi-media elements. For instance, a given text-based digital item that is an article may have text, as well as photos. As another example, a given text-based digital item that is a blog may include text, as well as embedded video elements.

The content is potentially "discoverable" to the electronic device 104 by various means. For example, the user 102 of the electronic device 104 can use a browser application (not depicted) and enter a Universal Resource Locator (URL) associated with the given one of the first network resource 132, the second network resource 134 and the plurality of additional network resources 136. Alternatively, the user 102 of the electronic device 104 can execute a search using a search engine (not depicted) to discover the content of one or more of the first network resource 132, the second network resource 134 and the plurality of additional network resources 136. As has been mentioned above, these are useful when the user 102 knows apriori which content the user 102 is interested in.

In accordance with embodiments of the present technology, the recommendation application 106 can recommend content items available from the given one of the first network resource 132, the second network resource 134 and the plurality of additional network resources 136 to the user 102, the content items that the user 102 may not apriori know about. The recommendation server 112 is configured to select content for the one or more recommendation items to be presented to the user 102 via the recommendation application 106. More specifically, the processing module 114 is configured to (i) receive from the electronic device 104 a request for the content recommendation 150 and (ii) responsive to the request, generate a recommended content message 152 specifically customized for the user 102 associated with the electronic device 104. The processing module 114 can further coordinate execution of various routines described herein as performed by the content discovery module 115, the analytics module 116, and the recommended content selection module 117 for example.

The processing module 114 is configured to store information extracted during processing in the main database 120. Generally speaking, the main database 120 may receive data from the processing module 114 that was extracted or otherwise determined by the processing module 114 during processing for temporary and/or permanent storage thereof and may provide stored data to the processing module 114 for use thereof.

In some embodiments of the present technology, the request for the content recommendation 150 can be generated in response to the user 102 providing an explicit indication of the user desire to receive the content recommendation. For example, the recommendation interface 108 can provide a button (or another actuatable element) to enable the user 102 to indicate her/his desire to receive a new or an updated content recommendation. As a non-limiting example, the recommendation interface 108 can provide an actuatable button that reads "Request a content recommendation". Within these embodiments, the request for the content recommendation 150 can be thought of as "an explicit request" in a sense of the user 102 expressly providing a request for the recommended content.

In other embodiments, the request for the content recommendation 150 can be generated in response to the user 102 providing an implicit indication of the user desire to receive the content recommendation. In some embodiments of the present technology, the request for the content recommendation 150 can be generated in response to the user 102 starting the recommendation application 106.

Alternatively, in those embodiments of the present technology where the recommendation application 106 is implemented as a browser (for example, a GOOGLE™ browser, a YANDEX™ browser, a YAHOO!™ browser or any other proprietary or commercially available browser application), the request for content recommendation 150 can be generated in response to the user 102 opening the browser application and can be generated, for example, without the user 102 executing any additional actions other than activating the browser application. As another example, the request for content recommendation 150 can be generated in response to the user 102 opening a new tab of the already-opened browser application and can be generated, for example, without the user 102 executing any additional actions other than activating the new browser tab. In other words, the request for the content recommendation 150 can be generated even without the user 102 knowing that the user 102 may be interested in obtaining a content recommendation.

As another example, the request for content recommendation 150 can be generated in response to the user 102 selecting a particular element of the browser application and can be generated, for example, without the user 102 executing any additional actions other than selecting/activating the particular element of the browser application.

Examples of the particular element of the browser application include but are not limited to:

An address line of the browser application bar

A search bar of the browser application and/or a search bar of a search engine web site accessed in the browser application An omnibox (combined address and search bar of the browser application)

A favourites or recently visited network resources pane

Any other pre-determined area of the browser application interface or a network resource displayed in the browser application How the recommended content selection module 117 generates content items for recommendation in response to the request for the content recommendation 150 will be explained in more detail herein below.

In some embodiments of the present technology, the content discovery module 115 can be configured to execute a "crawler" operation. In other words, the content discovery module 115 can execute a robot that "visits" a plurality of resources (such as a the plurality of network resources 130 including the first network resource 132, the second network resource 134 and the plurality of additional network resources 136) and catalogues one or more digital items hosted by a respective one of the first network resource 132, the second network resource 134 and the plurality of additional network resources 136. In some embodiments of the present technology, the content discovery module 115 can catalogue the digital items into an inverted index mapping a given digital item to a list of key words associated with the given digital item.

As part of the crawling function, the content discovery module 115 is configured to maintain information representative of the newly discovered network resources and/or newly discovered content available therefrom. In some embodiments, the content discovery module 115 can be configured to maintain an inverted index as an example in the recommendable content item database 124 within the data storage device 118, but the recommended content selection module 117 can arrange the information representative of the newly discovered network resources and/or newly discovered content available therefrom in a data structure other than an inverted index. In other embodiments, the content discovery module 115 may also be configured to extract features from the newly discovered network resources and/or newly discovered content available, and store the associated features, as a non-limiting example, in the item feature database 122.

In alternative embodiments of the present technology, rather than executing its dedicated content discovery module 115, the recommendation server 112 can share the functionality of content discovery module 115 with another server (not depicted) and/or another service (not depicted). For example, the functionality of the content discovery module 115 can be shared with a search engine server (not depicted) executing a search engine service. When the content discovery module 115 crawls and indexes new resources that may potentially host text-based or other digital items, the content discovery module 115 can also index such newly discovered (or updated) digital items for the purposes of the recommendation server 112 routines described herein.

The recommendable content item database 124 stores information/content associated with a pool of potentially recommendable content items by the recommendation service and that comprises some or all the content items discovered by the content discovery module 115. The nature of one or more potentially recommendable content items within the pool of recommendable content items is not particularly limited. Some examples of the one or more potentially recommendable content items include but are not limited to digital content items such as:

a news item;
a publication;
a web resource;
a weather of a location
a post on a social media web site;
a new item to be downloaded from an application store;
a new song (music track) to play/download from a resource;
an audiobook to play/download from a resource;
a podcast to play/download from a resource;
a new movie (video clip) to play/download from a resource;
a product to be bought from a resource; and
a new document uploaded for viewing on a social media web site (such as a new photo uploaded to an INSTRAGRAM™ or FACEBOOK™ account).

The pool of potentially recommendable content items can comprise at least one item from the respective pluralities of items associated with the plurality of network resources 130, even though this does not need to be the case in each and every embodiment of the present technology. The pool of potentially recommendable content items may then be recommended to users of the recommendation service by the recommended content selection module 117.

The analytics module 116 is configured to (i) track interactions of users with content items that were previously recommended by the recommendation service, and store the user interactions in the user interaction database 126, and (ii) extract information related to item features associated with, for example, content items that were previously recommended by the recommendation service to its previous users and with which at least one previous user has interacted in the item feature database 122.

Examples of user events/interactions associated with previous users of the system 100 tracked by the analytics module 116 and stored in the user interaction database 126 include but are not limited to:

a given user of the recommendation system "scrolled over" a given item;
a given user of the recommendation system "liked" or "disliked" the given item;
a given user of the recommendation system shared the given item;
a given user of the recommendation system has clicked on (or otherwise selected) the given item;
a given user of the recommendation system has spent time consulting the given item before returning to the recommendation system; and
a given user of the recommendation system has purchased/ordered/downloaded the given item.

As a non-limiting example, each of the user events/interactions in the user interaction database 126 may be associated with a respective timestamp, a respective content item, and a respective user.

Examples of item features extracted by the analytics module 116 and stored in the item feature database 122 include but are not limited to:

popularity of a given item amongst users of the recommendation service (for example, in case of the given item being a music track, how many times this given music track has been listened to/downloaded by users of the recommendation service);
a number of likes/purchases/downloads/clicks amongst all events associated with the given item and that have been performed via the recommendation service; and
item-inherent characteristics that are based on content of the respective content item—in case of the given item being a music track—length of the track, the genre of the track, audio-characteristic of the track (for example, tempo of the track); other item-inherent characteristics include: the price of the given item, the dimensions of the given item, the category of the given item, the producer/maker of the item, the length of the document measured in words or symbols; category/theme of the document; movie rating on a movie rating host, etc.

It should be expressly understood that the user events and the item features may take many forms and are not specifically limited. As such, above presented lists of non-limiting examples of the way that the user events and the item features may be implemented are just examples thereof. As such, it should be expressly understood that many other alternative implementations of the user events and the item features may be contemplated in different implementations of the present technology.

How information is obtained and stored in the item feature database 122, the recommendable content item database 124 and the user interaction database 126 is not particularly limited.

For example, the information related to the item features may be obtained from a particular service that maintains information about various items available therefrom and the like; and stored in the item feature database 122. The information related to the item features may be divided into various categories representative of various types or topics of items.

The recommended content selection module 117 can be configured to execute one or more machine learning algorithms (MLAs) to recommend content items to users of the content recommendation service. In some embodiments of the present technology, one or more machine learning algorithms can be any suitable or semi-supervised supervised machine learning algorithm, such as but not limited to:

Artificial neural network
Bayesian statistics
Gaussian process regression
Decision trees
And the like Generally speaking, the recommended content selection module 117 executes one or more MLAs to analyze the indexed content items (i.e. those discovered and indexed by the content discovery module 115 in the recommendable content item database 124 within the data storage device 118) to select one or more of the content items as content items for recommendation the user 102. The one or more MLAs executed by the recommended content selection module 117, may as an example, in response to the request for the content recommendation 150, select one or more indexed content items as content items for recommendation the user 102 based on (i) one or more item features of the indexed content items from the item feature database 122; and (ii) previous user interactions with indexed content items (associated with the user 102 or other users of the recommendation service) in the user interaction database 126.

It should be noted that even though the content discovery module 115, the analytics module 116, and the recommended content selection module 117 have been described as separate entities each executing its respective functionalities, in alternative embodiments of the present technology, the functionality executed by the content discovery module 115, the analytics module 116, and the recommended content selection module 117 can be executed by a single entity (such as the processing module 114, for example). Alternatively, the functionality executed the content discovery module 115, the analytics module 116, and the recommended content selection module 117 can be distributed amongst more modules than the ones depicted in FIG. 1 and can be executed as part of multiple instances of the recommendation server 112.

Furthermore, each one of the content discovery module 115, the analytics module 116, and the recommended content selection module 117 can execute additional functions (i.e. others than the respective functions described herein).

It should be noted that even though the main database 120, the item feature database 122, the recommendable content item database 124 and the user interaction database 126 are depicted as separate databases, this does not need to be so in each and every embodiment of the present technology. As such, some or all of the main database 120, the item feature database 122, the recommendable content item database 124 and the user interaction database 126 may be implemented in a single database. Furthermore, any one of the main database 120, the item feature database 122, the recommendable content item database 124, and the user interaction database 126 may, in itself, be split into several distributed storages devices (not depicted).

Figure 3:
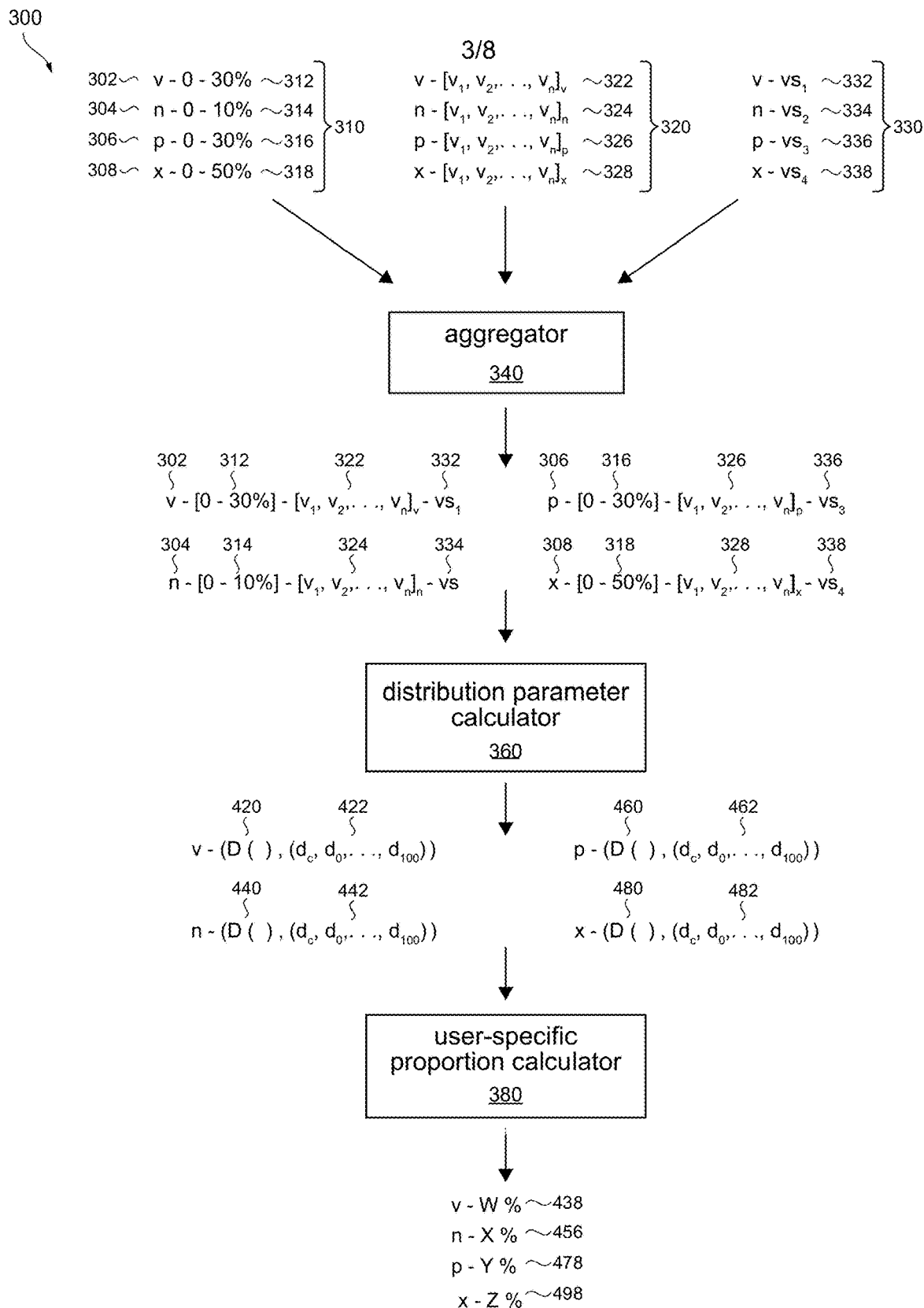
FIG. 3 schematically depicts an adaptive frequency system executed by the system of FIG. 1 in accordance with non-limiting embodiments of the present technology.
Figure 4:
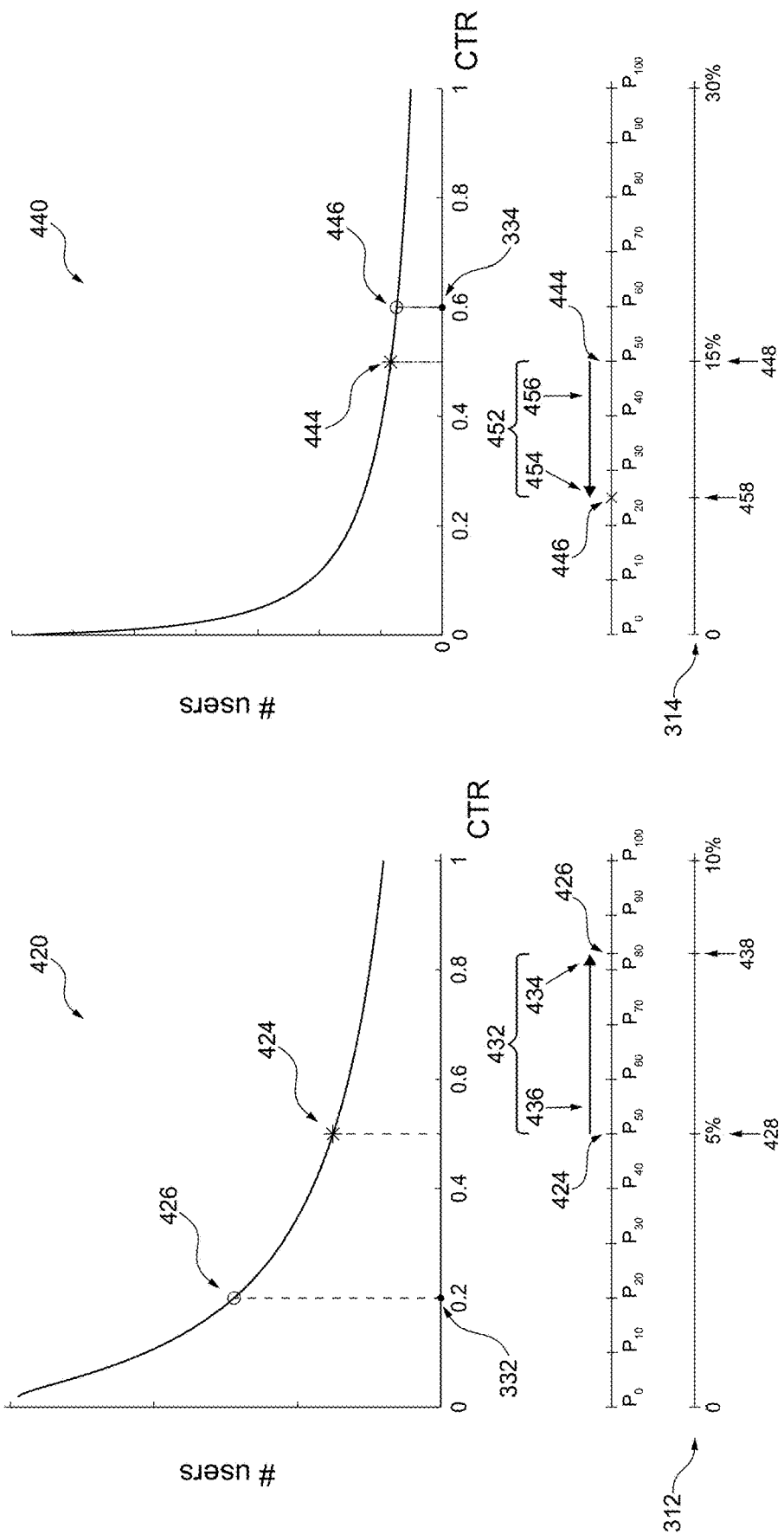
FIG. 4 and FIG. 5 schematically depict distributions of user interaction parameters and base interval of proportions generated by the adaptive frequency system of FIG. 3 in accordance with non-limiting embodiments of the present technology.
Figure 5:
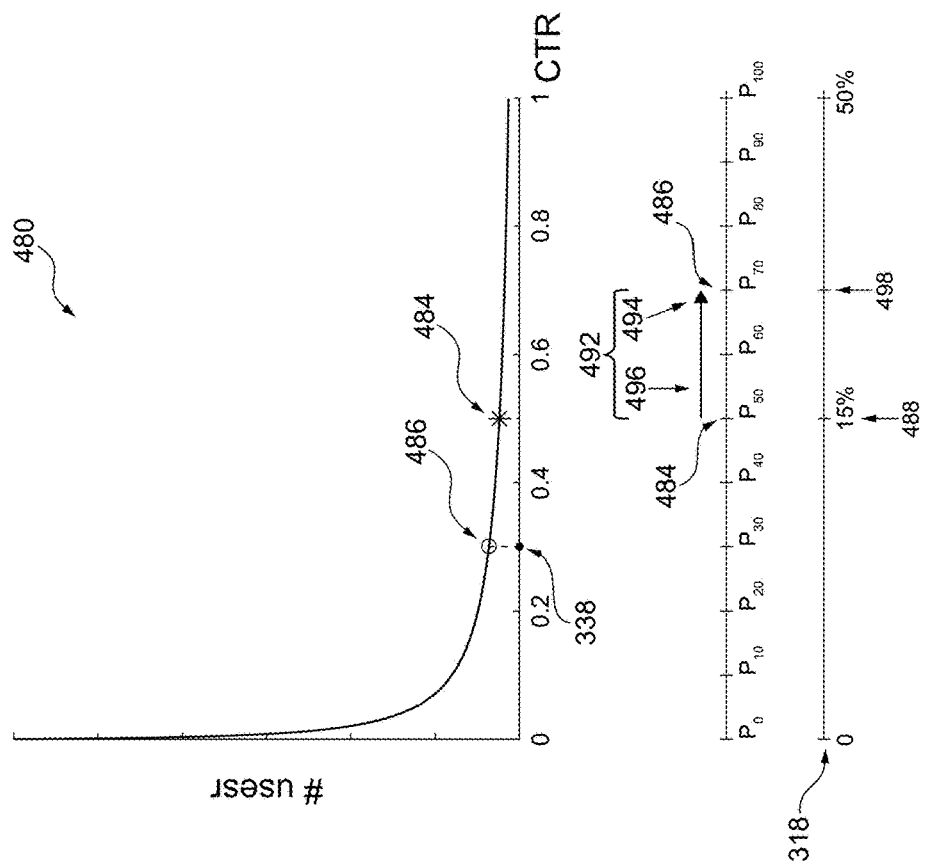
Figure 5:
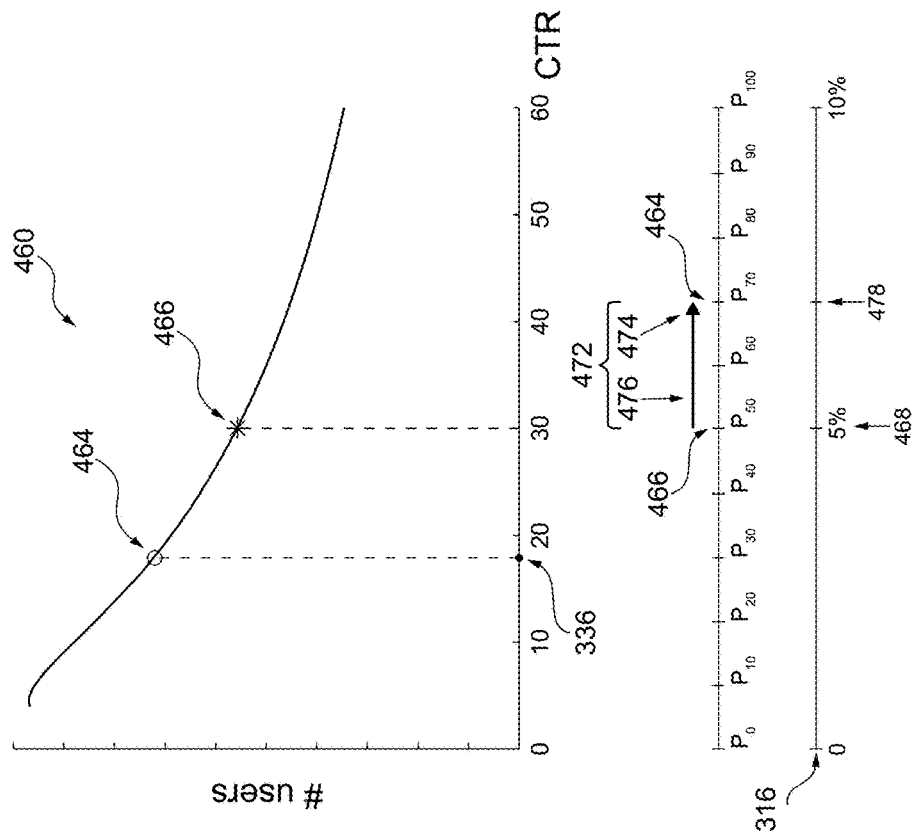

Reference is now made simultaneously to FIG. 3 to FIG. 5. FIG. 3 depicts a schematic diagram of an adaptive frequency system 300 executed within the system 100 in accordance with non-limiting embodiments of the present technology. FIGS. 4 and 5 depict a first distribution of user interaction parameters 420 and a first base interval of proportion 312, a second distribution of user interaction parameters 440 and a second base interval of proportion 314, a third distribution of user interaction parameters 460 and a third base interval of proportion 316, and a fourth distribution of user interaction parameters 480 and a fourth base interval of proportion 318 in accordance with non-limiting embodiments of the present technology.

The purpose of the adaptive frequency system 300 is to generate user-specific proportions of one or more types of content items for recommendation to a given user of the recommendation application 106, based on past user interactions of the given user with the recommendation application 106. As such, the user-specific proportions allow suggesting content items that may be more of interest to the given user of the recommendation application 106. In the embodiment illustrated herein, the given user may be the user 102.

The adaptive frequency system 300 includes an aggregator 340, a distribution parameter calculator 360, and a user-specific proportion calculator 380.

Generally speaking, the purpose of the aggregator 340 is to (i) acquire an indication of a plurality of base intervals of proportion of content for recommendation 310; and (ii) acquire, and filter user-interaction parameters associated with users (not depicted) of the content recommendation service, the users including the user 102.

The aggregator 340 may acquire, from the main database 120, the indication of the plurality of base intervals of proportion of content for recommendation 310, which generally specifies different proportions of type of content items for recommendation to users of the recommendation application 106. As illustrated herein, the indication of the plurality of base intervals of proportion of content for recommendation 310 includes the first base interval of proportion 312 associated with a first type of content 302, the second base interval of proportion 314 associated with a second type of content 304, the third base interval of proportion 316 associated with a third type of content 306, and the fourth base interval of proportion 318 associated with a fourth type of content 308. The number of types of content is not limited, but generally includes at least two types of content. In some embodiments, there may be an interval of proportion for some or all types of content provided by the recommendation application 106, or groups of types of content, e.g. text type content may include news content, email content, social media content, etc.

In the embodiment illustrated herein, the first type of content 302 may be news content, the second type of content 304 may be native content from a publisher associated with the recommendation application 106 (this type of content can be though of as "system-native content"), the third type of content 306 may be video content, and the fourth type of content 308 may be content from other publishers (such as other resources available on the Internet and the like).

As an example,
- the first base interval of proportion 312 may be 0 to 10%, and specifies that a proportion content items of the first type of content 302 presented to a given user of the recommendation system may be up to 10% of all content items presented to the given user,
- the second base interval of proportion 314 may be 0 to 30%, and specifies that a proportion content items of the second type of content 304 presented to the given user of the recommendation system may be up to 30% of all content items presented to the given user,
- the third base interval of proportion 316 may be 0 to 10%, and specifies that a proportion content items of the third type of content 306 presented to the given user of the recommendation system may be may be up to 10% of all content items presented to the given user, and
- the fourth base interval of proportion 318 may be 0 to 50%, and specifies that a proportion content items of the fourth type of content 306 presented to the given user of the recommendation system may be up to 50% of all content items presented to the given user.

The manner in which the base intervals of proportion are determined is not limited, and the base intervals of proportion may be determined, as an example, based on statistical data of the recommendation application 106, or may be chosen by operators of the recommendation application 106.

The aggregator 340 may acquire a plurality of sets of user interaction parameters 320 at predetermined periods of time, e.g. every few hours, or every day. In some embodiments, the aggregator 340 may acquire a plurality of sets of user interaction parameters 320 upon receiving the request for the content recommendation 150. The plurality of sets of user interaction parameters 320 may be acquired from the user interaction database 126. The plurality of sets of user interaction parameters 320 includes a first set of user interaction parameters 322 associated with the first type of content 302, a second set of user interaction parameters 324 associated with the second type of content 304, a third set of user interaction parameters 326 associated with the third type of content 306, and a fourth set of user interaction parameters 328 associated with the fourth type of content 308.

The first set of user interaction parameters 322 is associated with a first set of users (not depicted), the first set of user interaction parameters 322 being indicative of user engagement of the first set of users with the first type of content 302. Generally, each respective user interaction parameter of the first set of user interaction parameters 322 may be associated with a respective user of the first set of users, and may be an average of respective user interactions over a number of user sessions on the recommendation application 106 with content items of the first type of content 302 over a given period of time. As a non-limiting example, a respective user interaction parameter may be an average click-through rate (CTR) for news content of a respective user of the first set of users since the respective user has installed the recommendation application 106 on the electronic device 104.

The second set of user interaction parameters 324 is associated with a second set of users (not depicted), the second set of user interaction parameters 324 being indicative of user engagement of the second set of users with the second type of content 304. The second set of users may be the same as the first set of users, may include some users of the second set of users, or may include different users.

Generally, each respective user interaction parameter of the second set of user interaction parameters 324 may be associated with a respective user of the second set of users, and may be an average of user interactions of the respective user of the second set of users over a number of user sessions on the recommendation application 106 with content items of the second type of content 304 over a given period of time. As a non-limiting example, the respective user interaction parameter may be a CTR for native content of the respective user of the second set of users since the user has installed the recommendation application.

The third set of user interaction parameters 326 is associated with a third set of users (not depicted), the third set of user interaction parameters 326 being indicative of user engagement of the third set of users with the third type of content 306. Generally, each respective user interaction parameter of the third set of user interaction parameters 326 may be associated with a respective user of the third set of users, and may be an average of respective user interactions over a number of user sessions on the recommendation application 106 with content items of the third type of content 306 over a given period of time. As a non-limiting example, the respective user interaction parameter may be an average dwell time for video content items of a respective user of the third set of users since the respective user has installed the recommendation application 106.

The third set of users may or may not include users from the first set of users and the second set of users.

The fourth set of user interaction parameters 328 is associated with a fourth set of users (not depicted), the fourth set of user interaction parameters 328 being indicative of user engagement of the fourth set of users with the fourth type of content 308 on the recommendation application 106. Generally, each respective user interaction parameter of the fourth set of user interaction parameters 328 may be associated with a respective user of the fourth set of users, and may be an average of respective user interactions over a number of user sessions on the recommendation application 106 with content items of the fourth type of content 308 over a given period of time. As a non-limiting example, the respective user interaction parameter may be an average click-through rate (CTR) for publisher content items of a respective user of the third set of users since the respective user has installed the recommendation application 106.

The fourth set of users may or may not include users from the first set of users, the second set of users, and the third set of users.

The manner in which the plurality of sets of user interaction parameters 320 are acquired by the aggregator 340 from the user interaction database 126 is not limited. In some embodiments, the aggregator 340 may acquire user interactions associated with each of the first type of content 302, the second type of content 304, the third type of content 306, and the fourth type of content 308, for all sessions of the first set of users, the second set of users, the third set of users and the fourth set of users, and may then average and compute each respective one of the plurality of user-specific interaction parameters 330. In alternative embodiments, plurality of sets of user interaction parameters 320 may already have been precomputed in the user interaction database 126.

The aggregator 340 may acquire a plurality of user-specific interaction parameters 330 associated with the user 102 upon receiving the request for the content recommendation 150. The plurality of user-specific interaction parameters 330 may be acquired from the user interaction database 126. The plurality of user-specific interaction parameters 330 include a first user-specific interaction parameter 332 associated with the first type of content 302, a second user-specific interaction parameter 334 associated with the second type of content 304, a third user-specific interaction parameter 336 associated with the third type of content 306, and a fourth user-specific interaction parameter 338 associated with the fourth type of content 308.

The aggregator 340 may apply a sliding window of past user interactions to user interactions of the user 102 during the acquisition of the first user-specific interaction parameter 332, the second user-specific interaction parameter 334, the third user-specific interaction parameter 336, and the fourth user-specific interaction parameter 338. The sliding window of past user interactions has a predetermined size of a predefined number of past user sessions with the recommendation application 106. In other embodiments, the sliding window of past user interactions has a predetermined size of a period of time, such a number of hours, days, and weeks. As a non-limiting example, the sliding window of past user interactions may be the user interactions in the last 20 sessions of the user 102. As such, the purpose of the sliding window of past user interactions is to include the most recent user interactions of the user 102 with respect to each of the first type of content 302, the second type of content 304, the third type of content 306, and the fourth type of content 308, such that each of the first user-specific interaction parameter 332, the second user-specific interaction parameter 334, third user-specific interaction parameter 336, and the fourth user-specific interaction parameter 338 is representative of a current interest or engagement of the user with each of the first type of content 302, the second type of content 304, the third type of content 306, and the fourth type of content 308. Thus, every time a request for content recommendation is received at the recommendation server 112, each of the first user-specific interaction parameter 332, the second user-specific interaction parameter 334, the third user-specific interaction parameter 336, and the fourth user-specific interaction parameter 338 may be recomputed to take into account the most recent interactions of the user 102.

The first user-specific interaction parameter 332 is of the same type as each user-interaction parameters in the first set of user interaction parameters 322, the second user-specific interaction parameter 334 is of the same type as each of the user-interaction parameters in the second set of user interaction parameters 324, the third user-specific interaction parameter 336 is of the same type as each of the user-interaction parameters in the third set of user interaction parameters 326, and the fourth user-specific interaction parameter 338 is of the same type as each of the user-interaction parameters in the fourth set of user interaction parameters 328.

In the embodiment illustrated herein, the first user-specific interaction parameter 332 may be a CTR of 0.2, the second user-specific interaction parameter 334 may be a CTR of 0.34, the third user-specific interaction parameter 336 may be a dwell time of 47 seconds, and the fourth user-specific interaction parameter 338 may be a CTR of 0.3.

In some instances, as an example when the user 102 has a number of user interactions of a given one of the first type of content 302, the second type of content 304, the third type of content 306, and the fourth type of content 308, which is fewer than a respective predetermined threshold, the aggregator 340 may assign a predetermined value to the respective one of the first user-specific interaction parameter 332, the second user-specific interaction parameter 334, third user-specific interaction parameter 336, and the fourth user-specific interaction parameter 338 that has a number of user interactions below the predetermined threshold of user interactions in the user interaction database 126. As a non-limiting example, the predetermined threshold of the number of user interactions may be 20 user interactions with a given one of the first type of content 302, the second type of content 304, the third type of content 306, and the fourth type of content 308, and the respective predetermined value for each of the first user-specific interaction parameter 332, the second user-specific interaction parameter 334, third user-specific interaction parameter 336, and the fourth user-specific interaction parameter 338 may be a respective median of the associated distribution of user interaction parameters. Naturally, it is contemplated that different types of content can have different value for the threshold.

The aggregator 340 may associate the first base interval of proportion 312, with the first set of user interaction parameters 322, and the first user-specific interaction parameter 332, which may be all received as an input at the distribution parameter calculator 360. The aggregator 340 may associate the second base interval of proportion 314, the second set of user interaction parameters 324, the second user-specific interaction parameter 334 which may be all received as an input at the distribution parameter calculator 360. The aggregator 340 may associate the third base interval of proportion 316, the third set of user interaction parameters 326, and the third user-specific interaction parameter 336, which may be all received as an input at the distribution parameter calculator 360. The aggregator 340 may associate the fourth base interval of proportion 318, the fourth set of user interaction parameters 328, and the fourth user-specific interaction parameter 338 which may be all received as an input at the distribution parameter calculator 360.

Generally speaking, the purpose of the distribution parameter calculator 360 is to (i) compute a respective distribution of user interaction parameters for the first set of user interaction parameters 322, the second set of user interaction parameters 324, the third set of user interaction parameters 326, and the fourth set of user interaction parameters 328; and (ii) compute a respective set of distribution parameters for each of the respective distributions of user interaction parameters, which includes respective user-specific distribution parameters for each of the respective user-specific interaction parameters. The respective set of distribution parameters will then be used by the user-specific proportion calculator 380 to compute a respective user-specific proportion for each of the first type of content 302, the second type of content 304, the third type of content 306, and the fourth type of content 308.

The distribution parameter calculator 360 may compute, for the first set of user interaction parameters 322, a first distribution of user interaction parameters 420. The first distribution of user interaction parameters 420 is a frequency distribution of user interactions with the first type of content 302, where a given value of a user interaction parameter of the first set of user interaction parameters 322 is associated with a given number of users of the first set of users, the given number of users having on average a same value of the given user interaction parameter with the first type of content 302. In some embodiments, the first distribution of user interaction parameters 420 may be normalized. As a non-limiting example, it has been observed by developer(s) of the present technology that a distribution of CTRs is similar to a truncated log-normal distribution.

The distribution parameter calculator 360 may determine, from the first distribution of user interaction parameters 420, a first set of distribution parameters 422, the first set of distribution parameters 422 including a first central distribution parameter 424 and a first user-specific distribution parameter 426.

The first central distribution parameter 424 is a median of the first distribution of user interaction parameters 420. In some embodiments, the first set of distribution parameters 422 may include a plurality of percentile ranks of the first distribution of user interaction parameters 420, as a non-limiting example, the 10th percentile, 20th percentile, 30th percentile, 40th percentile, 50th percentile (the first central distribution parameter 424), 60th percentile, 70th percentile, 80th percentile, and 90th percentile. The percentiles ranks may be computed directly or interpolated.

The distribution parameter calculator 360 may compute the first user-specific distribution parameter 426 based on the first distribution of user interaction parameters 420 and the first user-specific interaction parameter 332, the first user-specific distribution parameter 426 being indicative of a location of the first user-specific interaction parameter 332 in the first distribution of user interaction parameters 420. The distribution parameter calculator 360 may compute a location of the first user-specific interaction parameter 332 in the first distribution of user interaction parameters 420, i.e. a number of users or a relative number of users associated with a value of the first user-specific interaction parameter 332. The distribution parameter calculator 360 may then compute the first user-specific distribution parameter 426, the first user-specific distribution parameter 426 corresponding to a percentile rank of the first distribution of user interaction parameters 420, the first user-specific distribution parameter 426 being indicative of a number or a relative number of users of the first set of users having at most user interaction parameters equal to the first user-specific interaction parameter 332.

The distribution parameter calculator 360 may compute, for the second set of user interaction parameters 324, a second distribution of user interaction parameters 440. The second distribution of user interaction parameters 440 is a frequency distribution of user interactions of the second set of users with the second type of content 304. In some embodiments, the second distribution of user interaction parameters 440 may be normalized.

The distribution parameter calculator 360 may determine, from the second distribution of user interaction parameters 440, a second set of distribution parameters 442, the second set of distribution parameters 442 including a second central distribution parameter 444, and a second user-specific distribution parameter 446.

The second central distribution parameter 444 is a median of the second distribution of user interaction parameters 440.

The distribution parameter calculator 360 may compute the second user-specific distribution parameter 446 based on the second distribution of user interaction parameters 440 and the second user-specific interaction parameter 334, the second user-specific distribution parameter 446 being indicative of a location of the second user-specific interaction parameter 334 in the second distribution of user interaction parameters 420. The distribution parameter calculator 360 may compute a location of the second user-specific interaction parameter 334 in the second distribution of user interaction parameters 420, i.e. a number of users or a relative number of users of second set of users associated with a value of the second user-specific interaction parameter 334. The distribution parameter calculator 360 may then compute the second user-specific distribution parameter 446, the second user-specific distribution parameter 446 corresponding to a percentile rank of the second distribution of user interaction parameters 440, the second user-specific distribution parameter 446 being indicative of a number or a relative number of users of the second set of users having at most user interaction parameters equal to the second user-specific interaction parameter 334.

The distribution parameter calculator 360 may compute, for the third set of user interaction parameters 326, a third distribution of user interaction parameters 460. The third distribution of user interaction parameters 460 is a frequency distribution of user interactions of the third set of users with the third type of content 306. In some embodiments, the third distribution of user interaction parameters 460 may be normalized.

The distribution parameter calculator 360 may determine, from the third distribution of user interaction parameters 460, a third set of distribution parameters 462, the third set of distribution parameters 442 including a including a third central distribution parameter 464, and a third user-specific distribution parameter 466.

The third central distribution parameter 464 is a median of third distribution of user interaction parameters 460.

The distribution parameter calculator 360 may compute the third user-specific distribution parameter 466 based on the third distribution of user interaction parameters 460 and the third user-specific interaction parameter 336, the third user-specific distribution parameter 466 being indicative of a location of the third user-specific interaction parameter 336 in the third distribution of user interaction parameters 420. The distribution parameter calculator 360 may compute a location of the third user-specific interaction parameter 336 in the third distribution of user interaction parameters 460, i.e. a number of users or a relative number of users of the third set of users associated with a value of the third user-specific interaction parameter 336. The distribution parameter calculator 360 may then compute the third user-specific distribution parameter 466, the third user-specific distribution parameter 466 corresponding to a percentile rank of the third distribution of user interaction parameters 460, the third user-specific distribution parameter 466 being indicative of a number or a relative number of users of the third set of users having at most user interaction parameters equal to the third user-specific interaction parameter 336.

The distribution parameter calculator 360 may compute, for the fourth set of user interaction parameters 328, a fourth distribution of user interaction parameters 480. The fourth distribution of user interaction parameters 480 is a frequency distribution of user interactions of the fourth set of users with the fourth type of content 308. In some embodiments, the fourth distribution of user interaction parameters 480 may be normalized.

The distribution parameter calculator 360 may determine, from the fourth distribution of user interaction parameters 480, a fourth set of distribution parameters 482, the fourth set of distribution parameters 482 including a fourth central distribution parameter 484, and a fourth user-specific distribution parameter 486.

The fourth central distribution parameter 484 is a median of the fourth distribution of user interaction parameters 480.

The distribution parameter calculator 360 may compute the fourth user-specific distribution parameter 486 based on the fourth distribution of user interaction parameters 480 and the fourth user-specific interaction parameter 338, the fourth user-specific distribution parameter 486 being indicative of a location of the fourth user-specific interaction parameter 338 in the fourth distribution of user interaction parameters 420. The distribution parameter calculator 360 may compute a location of the fourth user-specific interaction parameter 338 in the fourth distribution of user interaction parameters 480, i.e. a number of users of the fourth set of users associated with a value of the fourth user-specific interaction parameter 338. The distribution parameter calculator 360 may then compute the fourth user-specific distribution parameter 486, the fourth user-specific distribution parameter 486 corresponding to a percentile rank of the fourth distribution of user interaction parameters 480, the fourth user-specific distribution parameter 486 being indicative of a number or a relative number of users of the fourth set of users having at most user interaction parameters equal to the fourth user-specific interaction parameter 338.

The first set of distribution parameters 422, the second set of distribution parameters 442, the third set of distribution parameters 462, and the fourth set of distribution parameters 482 may be received at the user-specific proportion calculator 380.

Generally speaking, the purpose of the user-specific proportion calculator 380 is to compute user-specific proportions for each of the first type of content 302, the second type of content 304, the third type of content 306, and the fourth type of content 308 for the user 102 of the recommendation application 106.

The user-specific proportion calculator 380 may associate the first central distribution parameter 424 of the first set of distribution parameters 422 with a first central proportion 428 of the first base interval of proportion 312, the first central proportion 428 being a middle value or median of the first base interval of proportion 312. In the non-limiting embodiment illustrated herein, the first central distribution parameter 424 may correspond to a given number of users associated with a CTR of 0.5, and may be associated with 5%, which is the median of the first base interval of proportion 312, which goes from 0 to 10%.

In some embodiments, the user-specific proportion calculator 380 may compute a respective proportion value on the first base interval of proportion 312 corresponding to each of the first set of distribution parameters 422, i.e. proportions on the first base interval of proportion 312 corresponding to the percentiles ranks of the first distribution of user interaction parameters 420. In alternative embodiments, a table of correspondence between percentile ranks and the first base interval of proportion 312 may be predetermined and acquired as an example from the main database 120, where a given percentile rank is associated with a given proportion on the first base interval of proportion 312, and the first user-specific proportion 438 may be determined based on the table of correspondence.

The user-specific proportion calculator 380 may compute a first displacement 432 between the first user-specific distribution parameter 426 and the first central distribution parameter 424, the first displacement 432 indicating where the first user-specific distribution parameter 426 (i.e. percentile rank corresponding to a number of users or relative number of users of the first set of users associated with a value of the first user-specific interaction parameter 332) is in the first set of distribution parameters 422 relative to the first central distribution parameter 424 (i.e. median of the first set of distribution parameters 422). The first displacement 432 may then be used to determine a first user-specific proportion 438 on the first base interval of proportion 312, the first user-specific proportion 438 indicating a proportion of total content items of the first type for recommendation to the user 102.

The first displacement 432 may include (i) a direction of first displacement 434, and (ii) a magnitude of first displacement 436. The direction of first displacement 434 indicates if the first user-specific distribution parameter 426 is above (positive direction) or below (negative direction) the first central distribution parameter 424. The magnitude of first displacement 436 indicates a difference in percentile ranks between the first user-specific distribution parameter 426 and the first central distribution parameter 424.

In some embodiments, the first user-specific proportion 438 may be determined based solely on the direction of first displacement 434, where a positive direction may be associated with a first predetermined value to be assigned to the first user-specific proportion 438, and a negative direction may be associated with a second predetermined value to be assigned to the first user-specific proportion 438. As a non-limiting example, on the first base interval of proportion 312, a positive direction of first displacement 434, which corresponds to a first user-specific distribution parameter 426 that is above the $50^{th}$ percentile, may be associated with a first user-specific proportion 438 of 7.5%, and a negative direction of first displacement 434, which corresponds to a first user-specific distribution parameter 426 that is below the $50^{th}$ percentile, may be associated with a first user-specific proportion 438 of 2.5%.

In other embodiments, the first user-specific proportion 438 may be determined based on the direction of first displacement 434 and the magnitude of first displacement 436, where the direction and difference in percentile ranks may be proportionally adapted on the first base interval of proportion 312 to obtain the first user-specific proportion 438. Generally, the first user-specific proportion 438 may be rounded or adjusted such that it corresponds to a specific number of items out of all content items for recommendation to the user 102, e.g. if a total of 25 content items are recommended to the user 102 during a given session, a first user-specific proportion of 8.3% may be rounded to 8%, which corresponds to 2 content items of the first type of content 302, out of 25 total content items.

The user-specific proportion calculator 380 may compute a second user-specific proportion 458 for the second type of content 304 in a manner similar to the first user-specific proportion 438.

The user-specific proportion calculator 380 may associate the second central distribution parameter 444 of the second set of distribution parameters 442, with a second central proportion 448 of the second base interval of proportion 314, the second central proportion 448 being a middle value or median of the second base interval of proportion 314.

The user-specific proportion calculator 380 may compute a second displacement 452 between the second user-specific distribution parameter 446 and the second central distribution parameter 444. In the non-limiting embodiment illustrated herein, the second central distribution parameter 444 may be a number of users associated with a CTR of 0.5, and may be associated with the second central proportion 448 of 15% on the second base interval of proportion 314, which is the median of the second base interval of proportion 314, which goes from 0 to 30%.

In some embodiments, the second displacement 452 may include a direction of second displacement 454. In other embodiments, the second displacement 452 may include the direction of second displacement 454 and a magnitude of second displacement 456.

In some embodiments, the user-specific proportion calculator 380 may determine, for the second distribution of user interaction parameters 440, if the direction of second displacement 454 is one of: a positive direction of second displacement 454, and a negative direction of second displacement 454. In response to the direction of second displacement 454 being positive, the user-specific proportion calculator 380 may assign a respective first predetermined value to the second user-specific proportion 458, the respective first predetermined value being above the second central proportion 448. In response to the direction of second displacement 454 being negative, the user-specific proportion calculator 380 may assign a respective second predetermined value to the second user-specific proportion 458, the respective second predetermined value being below the second central proportion 448. In the embodiment illustrated herein, the positive direction of second displacement 454 may be associated with a value of 23%, and the negative direction of second displacement 454 may be associated with a value of 7%

In other embodiments, the user-specific proportion calculator 380 may compute the second user-specific proportion 458 based on the direction of second displacement 454 and the magnitude of second displacement 456. The second user-specific proportion 458 may be determined such that a distance between the second user-specific proportion 458 and the second central proportion 448 on the second base interval of proportion 314 is proportional to the magnitude of second displacement 456 on the second distribution of user interaction parameters 440.

The user-specific proportion calculator 380 may compute a third user-specific proportion 478 for the third type of content 306 in a manner similar to the first user-specific proportion 438.

The user-specific proportion calculator 380 may associate the third central distribution parameter 464 of the third set of distribution parameters 462, with a third central proportion 468 of the third base interval of proportion 316, the third central proportion 468 being a middle value or median of the third base interval of proportion 316.

The distribution parameter calculator 360 may compute a third displacement 472 between the third central distribution parameter 464 and the third user-specific distribution parameter 466. In some embodiments, the third displacement 472 may include a direction of third displacement 474. In other embodiments, the third displacement 472 may include the direction of third displacement 474 and a magnitude of third displacement 476.

In some embodiments, the user-specific proportion calculator 380 may determine, for the third distribution of user interaction parameters 460, if a direction of third displacement 474 is one of: a positive direction, and a negative direction. In response to the direction of third displacement 474 being positive, the user-specific proportion calculator 380 may assign a first predetermined value to the third user-specific proportion 478, the first predetermined value being above the third central proportion 468. In response to the direction of third displacement 474 being negative, the user-specific proportion calculator 380 may assign a second predetermined value to the third user-specific proportion 478, the second predetermined value being below the third central proportion 468. In the embodiment illustrated herein, the positive direction of third displacement 474 may be associated with a value of 10%, and the negative direction of third displacement 474 may be associated with a value of 7%

In other embodiments, the user-specific proportion calculator 380 may compute the third user-specific proportion 478 based on the direction of third displacement 474 and the magnitude of third displacement 476. The third user-specific proportion 478 may be determined such that a distance between the third central proportion 468 and the third user-specific proportion 478 on the third base interval of proportion 316 is proportional to the magnitude of third displacement 476.

The user-specific proportion calculator 380 may compute a fourth user-specific proportion 498 for the fourth type of content 308 in a manner similar to the first user-specific proportion 438.

The user-specific proportion calculator 380 may associate the fourth central distribution parameter 484 of the fourth set of distribution parameters 482, with a fourth central proportion 488 of the fourth base interval of proportion 318, the fourth central proportion 488 being a middle value or median of the fourth base interval of proportion 318.

The user-specific proportion calculator 380 may compute a fourth displacement 492 between the fourth central distribution parameter 484 and the fourth user-specific distribution parameter 486. In some embodiments, the fourth displacement 492 may include a direction of fourth displacement 494. In other embodiments, the fourth displacement 492 may include the direction of fourth displacement 494 and a magnitude of fourth displacement 496.

In some embodiments, the user-specific proportion calculator 380 may determine, for the fourth distribution of user interaction parameters 480, if a direction of fourth displacement 494 is one of: a positive direction of fourth displacement 494, and a negative direction of fourth displacement 494. In response to the direction of fourth displacement 494 being positive, the user-specific proportion calculator 380 may assign a first predetermined value to the fourth user-specific proportion 498, the first predetermined value being above the fourth central proportion 488. In response to the direction of fourth displacement 494 being negative, the user-specific proportion calculator 380 may assign a second predetermined value to the fourth user-specific proportion 498, the second predetermined value being below the fourth central proportion 488. In the embodiment illustrated herein, the positive direction of fourth displacement 494 may be associated with a value of 38%, and the negative direction of fourth displacement 494 may be associated with a value of 12%.

In other embodiments, the user-specific proportion calculator 380 may compute the fourth user-specific proportion 498 based on the direction of fourth displacement 494 and the magnitude of fourth displacement 496. The third user-specific proportion 478 may be determined such that a distance between the fourth central proportion 488 and the fourth user-specific proportion 498 is proportional to the magnitude of fourth displacement 496.

The user-specific proportion calculator 380 may compute a sum of the first user-specific proportion 438, second user-specific proportion 458, the third user-specific proportion 478 and the fourth user-specific proportion 498. If the sum is not equal to a predetermined summation threshold of 100%, the user-specific proportion calculator 380 may proportionally adjust each the first user-specific proportion 438, second user-specific proportion 458, the third user-specific proportion 478 and the fourth user-specific proportion 498 such that the sum is equal to a 100%.

Having described, with reference to FIG. 3 to FIG. 5, an adaptive frequency system 300 in accordance with non-limiting embodiments of the present technology, we shall now describe methods for generating user-specific proportions with reference to FIG. 5 to FIG. 8.

Figure 6:
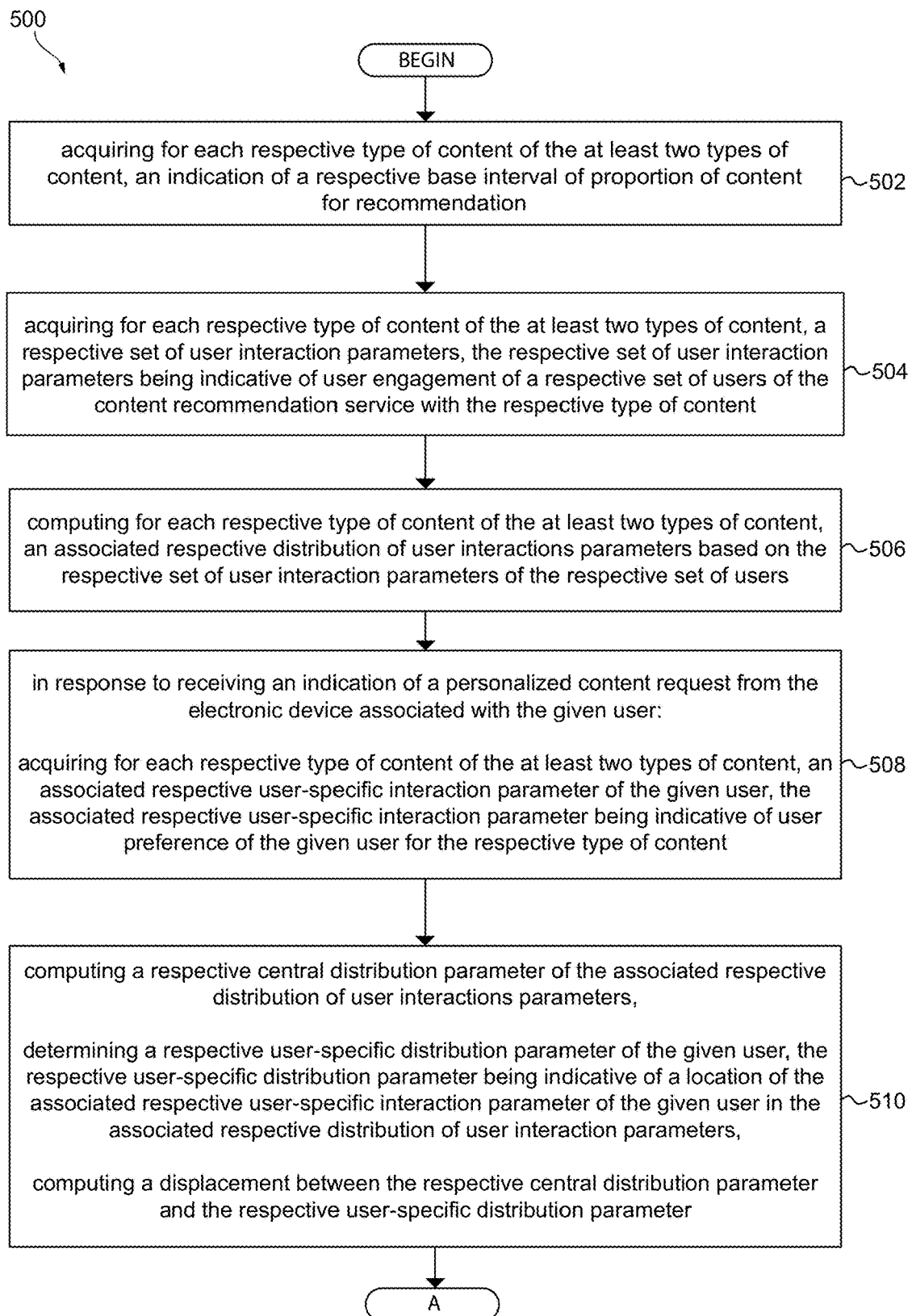
FIG. 6 and FIG. 7 depict a block diagram of a first method for determining user-specific proportions of content for recommendation to a given user, the method executable within the system of FIG. 1 in accordance with embodiments of the present technology.
Figure 7:
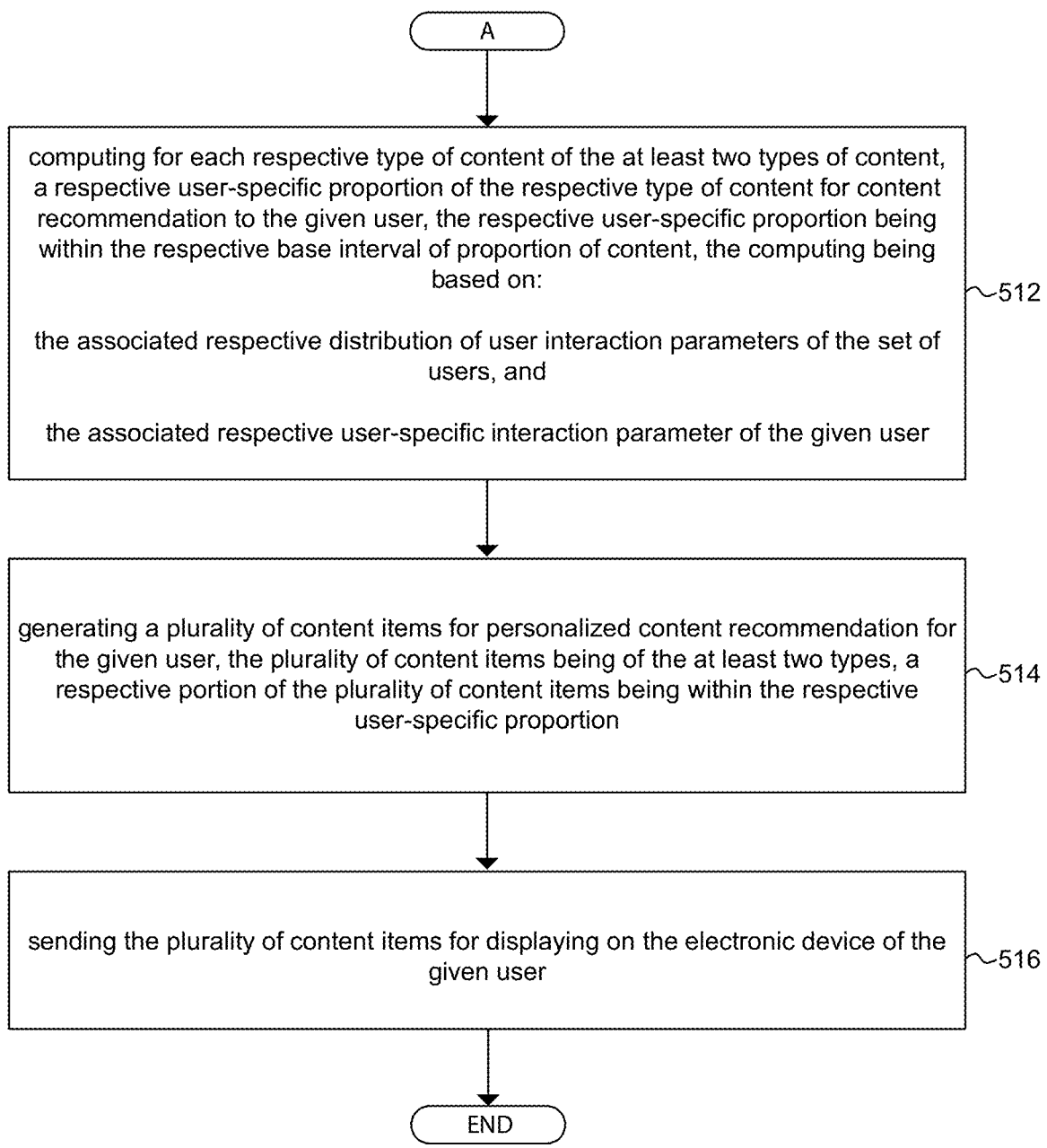

FIGS. 6 and 7 depict a block diagram of a method 500 of generating user-specific proportions according to non-limiting embodiments of the present technology. The method 500 may be executed within the system 100 of FIG. 1.

The method 500 may begin at step 502.

STEP 502: acquiring for each respective type of content of the at least two types of content, an indication of a respective base interval of proportion of content for recommendation.

At step 502, the aggregator 340 of the recommendation server 112 may acquire, from the main database 120, an indication of the plurality of base intervals of proportion of content for recommendation 310. The indication of the plurality of base intervals of proportion of content for recommendation 310 includes a first base interval of proportion 312 associated with a first type of content 302, a second base interval of proportion 314 associated with a second type of content 304, a third base interval of proportion 316 associated with a third type of content 306, and a fourth base interval of proportion 318 associated with a fourth type of content 308. The first type of content 302 may be video content, the second type of content 304 may be x content, the third type of content 306 may be y content, and the fourth type of content 308 may be z content. The first base interval of proportion 312 may be 0 to 10%, the second base interval of proportion 314 may be 0 to 40%, the third base interval of proportion 316 may be 0 to 40%, and the fourth base interval of proportion 318 may be 0 to 40%.

The method 500 may then advance to step 504.

STEP 504: acquiring for each respective type of content of the at least two types of content, a respective set of user interaction parameters, the respective set of user interaction parameters being indicative of user engagement of a respective set of users of the content recommendation service with the respective type of content At step 504, the aggregator 340 of the recommendation server 112 may acquire a plurality of sets of user interaction parameters 320. The plurality of sets of user interaction parameters 320 includes a first set of user interaction parameters 322 associated with the first type of content 302, a second set of user interaction parameters 324 associated with the second type of content 304, a third set of user interaction parameters 326 associated with the third type of content 306, and a fourth set of user interaction parameters 328 associated with the fourth type of content 308.

The method 500 may then advance to step 506.

STEP 506: computing for each respective type of content of the at least two types of content, an associated respective distribution of user interaction parameters based on the respective set of user interaction parameters of the respective set of users.

At step 506, the distribution parameter calculator 360 of the recommendation server 112 may compute: for the first set of user interaction parameters 322, a first distribution of user interaction parameters 420, for the second set of user interaction parameters 324, a second distribution of user interaction parameters 440, for the third set of user interaction parameters 326, a third distribution of user interaction parameters 460 and for the fourth set of user interaction parameters 328, a fourth distribution of user interaction parameters 480.

The method 500 may then advance to step 506.

STEP 508: in response to receiving an indication of a personalized content request from the electronic device associated with the given user:
  acquiring for each respective type of content of the at least two types of content, an associated respective user-specific interaction parameter of the given user, the associated respective user-specific interaction parameter being indicative of user preference of the given user for the respective type of content.

At step 508, the recommendation server 112 may receive a request for content recommendation 150 from the electronic device 104 of the user 102. In response to the request for content recommendation 150, the aggregator 340 of the recommendation server 112 may acquire a plurality of user-specific interaction parameters 330 associated with the user 102. The plurality of user-specific interaction parameters 330 includes a first user-specific interaction parameter 332 indicative of user preference of the user 102 for the first type of content 302, a second user-specific interaction parameter 334 indicative of user preference of the user 102 for the second type of content 304, a third user-specific interaction parameter 336 indicative of user preference of the user 102 for the third type of content 306, and a fourth user-specific interaction parameter 338 indicative of user preference of the user 102 for the fourth type of content 308.

The method 500 may then advance to step 510.

STEP 510: computing a respective central distribution parameter of the associated respective distribution of user interaction parameters,
  determining a respective user-specific distribution parameter of the given user, the respective user-specific distribution parameter being indicative of a location of the associated respective user-specific interaction parameter of the given user in the associated respective distribution of user interaction parameters,
  computing a displacement between the respective central distribution parameter and the respective user-specific distribution parameter At step 510, the distribution parameter calculator 360 of the recommendation server 112 may compute, from the first distribution of user interaction parameters 420, a first set of distribution parameters 422, the first set of distribution parameters 422 including a first central distribution parameter 424 and a first user-specific distribution parameter 426.

The distribution parameter calculator 360 may then compute a first displacement 432 between the first user-specific distribution parameter 426 and the first central distribution parameter 424. In some embodiments, the first displacement 432 may include a direction of first displacement 434. In other embodiments, the first displacement 432 may include the direction of first displacement 434 and a magnitude of first displacement 436

The distribution parameter calculator 360 of the recommended content selection module 117 of the recommendation server 112 may compute, from the second distribution of user interaction parameters 440, a second set of distribution parameters 442, the second set of distribution parameters 442 including a second central distribution parameter 444 and a second user-specific distribution parameter 446.

The distribution parameter calculator 360 may then compute a second displacement 452 between the second user-specific distribution parameter 446 and the second central distribution parameter 444. In some embodiments, the second displacement 452 may include a direction of second displacement 454. In other embodiments, the second displacement 452 may include the direction of second displacement 454 and a magnitude of second displacement 456.

In some embodiments, the user-specific proportion calculator 380 may determine, for the second distribution of user interaction parameters 440, if the direction of second displacement 454 is one of: a positive direction of second displacement 454, and a negative direction of second displacement 454. In response to the direction of second displacement 454 being positive, the user-specific proportion calculator 380 may assign a respective first predetermined value to the second user-specific proportion 458, the respective first predetermined value being above the first central proportion 428. In response to the direction of second displacement 454 being negative, the user-specific proportion calculator 380 may assign a respective second predetermined value to the second user-specific proportion 458, the second predetermined value being below the first central proportion 428.

In other embodiments, the user-specific proportion calculator 380 may compute the second user-specific proportion 458 based on the direction of second displacement 454 and the magnitude of second displacement 456. The second user-specific proportion 458 may be determined such that a distance between the second user-specific proportion 458 and the second central proportion 448 on the second base interval of proportion 314 is proportional to the magnitude of second displacement 456 on the second distribution of user interaction parameters 440.

The distribution parameter calculator 360 of the recommended content selection module 117 of the recommendation server 112 may compute, from the third distribution of user interaction parameters 460, a third set of distribution parameters 462, the third set of distribution parameters 462 including a third central distribution parameter 464 and a third user-specific distribution parameter 466.

The distribution parameter calculator 360 may then compute a third displacement 472 between the third central distribution parameter 464 and the third user-specific distribution parameter 466. In some embodiments, the third displacement 472 may include a direction of third displacement 474. In other embodiments, the third displacement 472 may include the direction of third displacement 474 and a magnitude of third displacement 476.

The distribution parameter calculator 360 of the recommended content selection module 117 of the recommendation server 112 may compute, from the fourth distribution of user interaction parameters 480, a fourth set of distribution parameters 482, the fourth set of distribution parameters 482 including a fourth central distribution parameter 484 and a fourth user-specific distribution parameter 486.

The distribution parameter calculator 360 may then compute a fourth displacement 492 between the fourth central distribution parameter 484 and the fourth user-specific distribution parameter 486. In some embodiments, the fourth displacement 492 may include a direction of fourth displacement 494. In other embodiments, the fourth displacement 492 may include the direction of fourth displacement 494 and a magnitude of fourth displacement 496.

The method 500 may then advance to step 512.

STEP 512: computing for each respective type of content of the at least two types of content, a respective user-specific proportion of the respective type of content for content recommendation to the given user, the respective user-specific proportion being within the respective base interval of proportion of content.

At step 512, the user-specific proportion calculator 380 may compute a plurality of user-specific proportions 385, the plurality of user-specific proportions 385 including a first user-specific proportion 438 for the first type of content 302, a second user-specific proportion 458 for the second type of content 304, a third user-specific proportion 478 for the third type of content 306, and a fourth user-specific proportion 498 for the fourth type of content 308.

Predetermined Value of User-Specific Proportion Based on Direction of Displacement In some embodiments, the user-specific proportion calculator 380 may determine, for the first distribution of user interaction parameters 420, if the direction of first displacement 434 is one of: a positive direction, and a negative direction. In response to the direction of first displacement 434 being positive, the user-specific proportion calculator 380 may assign a first predetermined value to the first user-specific proportion 438, the first predetermined value being above the respective central proportion. In response to the direction of first displacement 434 being negative, the user-specific proportion calculator 380 may assign a second predetermined value to the user-specific proportion, the second predetermined value being below the respective central proportion.

In some embodiments, the user-specific proportion calculator 380 may determine, for the second distribution of user interaction parameters 440, if the direction of second displacement 454 is one of: a positive direction of second displacement 454, and a negative direction of second displacement 454. In response to the direction of second displacement 454 being positive, the user-specific proportion calculator 380 may assign a respective first predetermined value to the second user-specific proportion 458, the respective first predetermined value being above the second central proportion 448. In response to the direction of second displacement 454 being negative, the user-specific proportion calculator 380 may assign a respective second predetermined value to the second user-specific proportion 458, the second predetermined value being below the second central proportion 448.

In some embodiments, the user-specific proportion calculator 380 may determine, for the third distribution of user interaction parameters 460, if a direction of third displacement 474 is one of: a positive direction, and a negative direction. In response to the direction of third displacement 474 being positive, the user-specific proportion calculator 380 may assign a first predetermined value to the third user-specific proportion 478, the first predetermined value being above the third central proportion 468. In response to the direction of third displacement 474 being negative, the user-specific proportion calculator 380 may assign a second predetermined value to the third user-specific proportion 478, the second predetermined value being below the third central proportion 468.

In some embodiments, the user-specific proportion calculator 380 may determine, for the fourth distribution of user interaction parameters 480, if a direction of fourth displacement 494 is one of: a positive direction of fourth displacement 494, and a negative direction of fourth displacement 494. In response to the direction of fourth displacement 494 being positive, the user-specific proportion calculator 380 may assign a first predetermined value to the fourth user-specific proportion 498, the first predetermined value being above the fourth central proportion 488. In response to the direction of fourth displacement 494 being negative, the user-specific proportion calculator 380 may assign a second predetermined value to the fourth user-specific proportion 498, the second predetermined value being below the fourth central proportion 488.

User-Specific Proportion Based on Direction and Magnitude of Displacement

In other embodiments, the user-specific proportion calculator 380 may compute the first user-specific proportion 438 based on the direction of first displacement 434 and the magnitude of first displacement 436. The first user-specific proportion 438 may be determined such that a distance between the first user-specific proportion 438 and the first central proportion 428 is proportional to the magnitude of first displacement 436 on the first distribution of user interaction parameters 420.

In other embodiments, the user-specific proportion calculator 380 may compute the second user-specific proportion 458 based on the direction of second displacement 454 and the magnitude of second displacement 456. The second user-specific proportion 458 may be determined such that a distance between the second user-specific proportion 458 and the second central proportion 448 on the second base interval of proportion 314 is proportional to the magnitude of second displacement 456 on the second distribution of user interaction parameters 440.

In other embodiments, the user-specific proportion calculator 380 may compute the third user-specific proportion 478 based on the direction of third displacement 474 and the magnitude of third displacement 476. The third user-specific proportion 478 may be determined such that a distance between the third central proportion 468 and the third user-specific proportion 478 on the third base interval of proportion 316 is proportional to the magnitude of third displacement 476.

In other embodiments, the user-specific proportion calculator 380 may compute the fourth user-specific proportion 498 based on the direction of fourth displacement 494 and the magnitude of fourth displacement 496. The fourth user-specific proportion 498 may be determined such that a distance between the fourth central proportion 488 and the fourth user-specific proportion 498 is proportional to the magnitude of fourth displacement 496.

The user-specific proportion calculator 380 may compute a sum of the first user-specific proportion 438, second user-specific proportion 458, the third user-specific proportion 478 and the fourth user-specific proportion 498. If the sum is not equal to a 100%, the user-specific proportion calculator 380 may proportionally adjust each the first user-specific proportion 438, second user-specific proportion 458, the third user-specific proportion 478 and the fourth user-specific proportion 498 such that the sum is equal to 100%.

The method 500 may then advance to step 514.

STEP 514: generating a plurality of content items for personalized content recommendation for the given user, the plurality of content items being of the at least two types, a respective portion of the plurality of content items being within the respective user-specific proportion At step 514, the processing module 114 of the recommended content selection module 117 of the recommendation server 112 may generate via the recommended content selection module 117, a plurality of content items for recommendation to the user 102, the plurality of content items including content items of the first type of content 302 being within the first user-specific proportion 438, content items of the second type of content 304 being within the second user-specific proportion 458, content items of the third type of content 306 being within the third user-specific proportion 478, and content items of the fourth type of content 308 being within the fourth user-specific proportion 498

The method 500 may then advance to step 516.

STEP 516: sending the plurality of content items for displaying on the electronic device of the given user.

At step 516, the processing module 114 of the recommended content selection module 117 of the recommendation server 112 may send a recommended content message 152 including the plurality of content items for recommendation to the electronic device 104 of the user 102 via the communication network 110. The plurality of content items includes content items of the first type of content 302 being within the first user-specific proportion 438, content items of the second type of content 304 being within the second user-specific proportion 458, content items of the third type of content 306 being within the third user-specific proportion 478, and content items of the fourth type of content 308 being within the fourth user-specific proportion 498.

The method 500 may then end.

Figure 8:
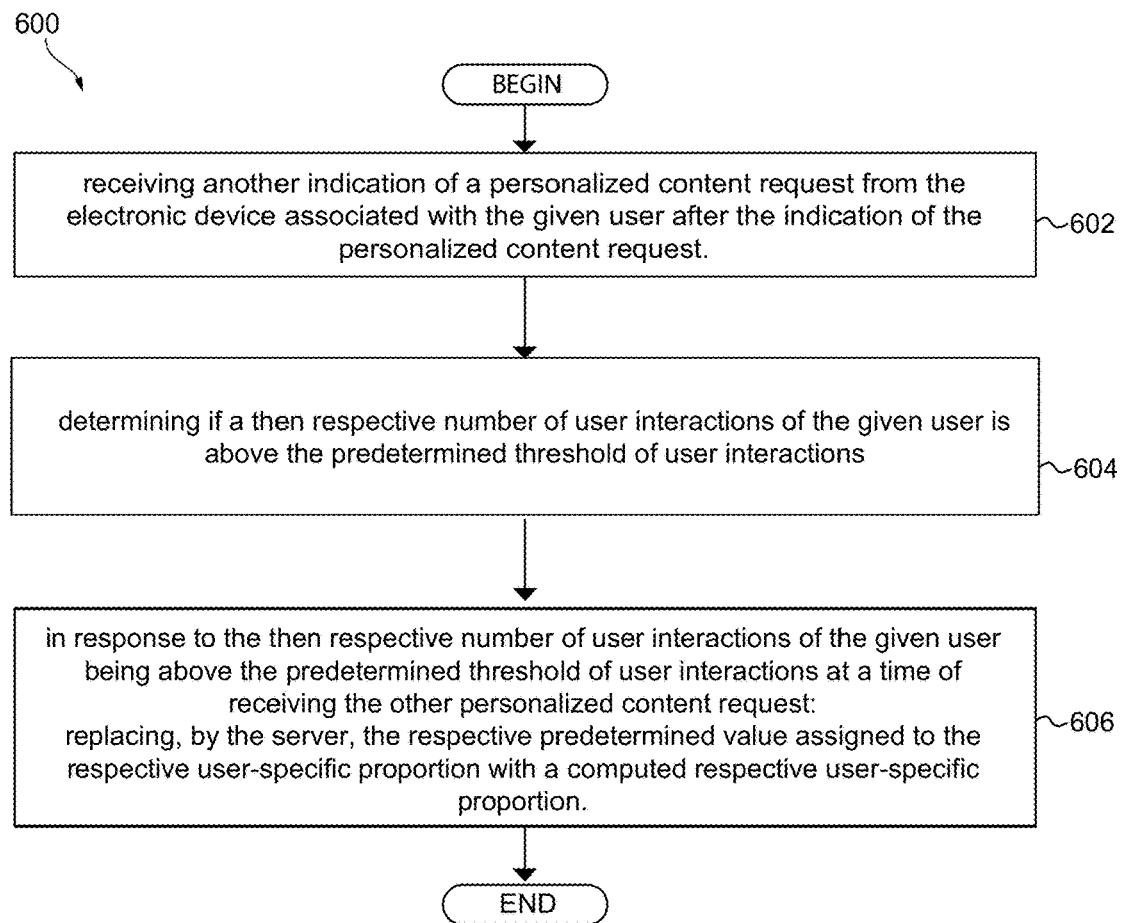
FIG. 8 depicts a block diagram of a second method for determining user-specific proportions of content for recommendation to a given user, the method executable within the system of FIG. 1 in accordance with embodiments of the present technology.

FIG. 8 depicts a flowchart of a method 600 of generating user-specific proportions according to non-limiting embodiments of the present technology. The method 600 may be executed after the method 500, in instances when the user 102 had a number of user interactions below a predetermined threshold of user interactions with at least one of the first type of content 302, the second type of content 304, the third type of content 406, and the fourth type of content 308 and where a respective user-specific proportion has been assigned a predetermined value.

The method 600 may be executed within the system 100 of FIG. 1.

The method 600 may begin at step 602.

STEP 602: receiving another indication of a personalized content request from the electronic device associated with the given user after the indication of the personalized content request.

At step 602, the recommendation server 112 may receive another request for content recommendation (not depicted) from the electronic device 104 of the user 102, the other request being received after the request for content recommendation 150.

The method 600 may then advance to step 604.

STEP 604: determining if a then respective number of user interactions of the given user is above the predetermined threshold of user interactions At step 604, in response to receiving the another request for content recommendation, the aggregator 340 of the recommendation server 112 may determine, for each of the first type of content 302, the second type of content 304, the third type of content 406, and the fourth type of content 308, if a respective number of user interactions in the user interaction database 126 is above the predetermined threshold of user interactions.

The method 600 may then advance to step 606.

STEP 606: in response to the then respective number of user interactions of the given user being above the predetermined threshold of user interactions at a time of receiving the other personalized content request:
  replacing, by the server, the respective predetermined value assigned to the respective user-specific proportion with a computed respective user-specific proportion.

At step 606, in response to the number of user interactions associated with of the user 102 being above the predetermined threshold of user interactions for one or more of the first type of content 302, the second type of content 304, the third type of content 406, and the fourth type of content 308, the method 600 may re-compute a respective user-specific proportion by going through steps 510 to 516.

If the number of one or more of the respective user interactions of the first type of content 302, the second type of content 304, the third type of content 406, and the fourth type of content 308 are again below the predetermined threshold of user interactions, the aggregator 340 may assign a respective predetermined value to the respective user-specific proportion (i.e. one of the first user-specific proportion 438, the second user-specific proportion 458, the third user-specific proportion 478, and the fourth user-specific proportion 498 for the fourth type of content 308) having user interactions below the predetermined threshold of user interactions. The predetermined value may be a media of the respective one of the first base interval of proportion 312 associated with the first type of content 302, the second base interval of proportion 314 associated with the second type of content 304, the third base interval of proportion 316 associated with a third type of content 306, and the fourth base interval of proportion 318 associated with the fourth type of content 308.

The method 600 may then end.

It should be apparent to those skilled in the art that at least some embodiments of the present technology aim to expand a range of technical solutions for addressing a particular technical problem, namely recommending personalized content of interest to users of a recommendation system to maximize user interactions with the personalized content, which may save computational resources and bandwidth on both client device and server.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for determining user-specific proportions of at least two types of content for content recommendations to a given user, the given user being associated with an electronic device, the electronic device being connected to a server over a communication network, the server hosting a content recommendation service, the content recommendation service for generating the content recommendations having content items of the at least two types of content,
the method executable by the server, the method comprising:
acquiring, by the server, for each respective type of content of the at least two types of content, an indication of a respective base interval of proportion;
acquiring, by the server, for each respective type of content of the at least two types of content, a respective set of user interaction parameters, the respective set of user interaction parameters being indicative of user engagement of a respective set of users of the content recommendation service with the respective type of content;
computing, by the server, for each respective type of content of the at least two types of content, an associated respective distribution of user interaction parameters based on the respective set of user interaction parameters of the respective set of users;
in response to receiving an indication of a personalized content request from the electronic device associated with the given user:
acquiring, by the server, for each respective type of content of the at least two types of content, an associated respective user-specific interaction parameter of the given user, the associated respective user-specific interaction parameter being indicative of user preference of the given user for the respective type of content;
computing, by the server, for each respective type of content of the at least two types of content, a respective user-specific proportion of the respective type of content for content recommendation to the given user, the respective user-specific proportion being within the respective base interval of proportion, the computing being based on:
the associated respective distribution of user interaction parameters of the set of users, and
the associated respective user-specific interaction parameter of the given user;
generating, by the content recommendation service of the server, a plurality of content items for personalized content recommendation for the given user, the plurality of content items being of the at least two types of content, a respective portion of the plurality of content items being within the respective user-specific proportion; and
sending, by the server, the plurality of content items for displaying on the electronic device of the given user.

2. The method of claim 1, wherein:
prior to the computing the respective user-specific proportion of the respective type of content, the method further comprises:
computing, by the server, a respective central distribution parameter of the associated respective distribution of user interaction parameters;
determining, by the server, a respective user-specific distribution parameter of the given user, the respective user-specific distribution parameter being indicative of a location of the associated respective user-specific interaction parameter of the given user in the associated respective distribution of user interaction parameters;
computing, by the server, a displacement between the respective central distribution parameter and the respective user-specific distribution parameter; and
wherein
the computing the respective user-specific proportion of the respective type of content is further based on:
the displacement between the respective central distribution parameter and the respective user-specific distribution parameter, and a respective central proportion of the respective base interval of proportions that corresponds to the respective central distribution parameter of the associated respective distribution of user interaction parameters.

3. The method of claim 2, wherein the computing the respective user-specific proportion of the respective type of content further comprises:
determining, by the server, if a direction of the displacement between the respective central distribution parameter and the respective user-specific distribution parameter is one of: a positive direction, and a negative direction;
in response to the direction being positive:
assigning, by the server, a respective first predetermined value to the respective user-specific proportion, the respective first predetermined value being above the respective central proportion; and
in response to the direction being negative:
assigning, by the server, a respective second predetermined value to the respective user-specific proportion, the respective second predetermined value being below the respective central proportion.

4. The method of claim 3, wherein:
a respective distance between the respective first predetermined value and the respective central proportion on the base interval of proportions is proportional to a magnitude of the displacement between the respective central distribution parameter and the respective user-specific distribution parameter; and
a respective distance between the respective second predetermined value and the respective central proportion on the base interval of proportions is proportional to the magnitude of the displacement between the respective central distribution parameter and the respective user-specific distribution parameter.

5. The method of claim 4, wherein:
the respective central distribution parameter is a median of the associated respective distribution of user interactions.

6. The method of claim 5, wherein:
the respective central proportion is a median of the respective base interval of proportion.

7. The method of claim 6, wherein:
the respective user-specific distribution parameter is a percentile rank of the respective user-specific interaction parameter of the given user in the respective distribution of user interaction parameters.

8. The method of claim 3, wherein the at least two types of content include at least two of: text content, native content, non-native content, image content, video content, audio content, and weather content.

9. The method of claim 8, wherein:
the respective set of user interaction parameters and the respective user-specific interaction parameter associated with the respective type of content of the at least two types of content are a same type of interaction parameter; and
the method further comprises, using as the same type of interaction parameter for the respective type of content:
for the text content, a click-through rate (CTR);
for the native content, a click-through rate (CTR);
for the non-native content, a click-through rate (CTR);
for the image content, a click-through rate (CTR);
for the video content, a dwell time;
for the audio content, a dwell time; and
for the weather content, a click-through rate (CTR).

10. The method of claim 3, wherein:
the server is connected to a log database;
the acquiring the respective user-specific interaction parameter comprises:
applying, by the server, a sliding window of past user interactions to user interactions associated with the given user in the log database; and
computing, by the server, the respective user-specific interaction parameter based on the user interactions associated with the given user in the log database that fall within the sliding window of past user interactions.

11. The method of claim 10, further comprising, in response to a respective number of the user interactions associated with the given user that fall within the sliding window of past user interactions being below a predetermined threshold of user interactions:
assigning, by the server, a respective predetermined value to the respective user-specific proportion.

12. The method of claim 11, further comprising:
receiving, by the server, another indication of a personalized content request from the electronic device associated with the given user after the indication of the personalized content request;
determining, by the server, if a then respective number of user interactions of the given user is above the predetermined threshold of user interactions; and
in response to the then respective number of user interactions of the given user being above the predetermined threshold of user interactions at a time of receiving the other personalized content request:
replacing, by the server, the respective predetermined value assigned to the respective user-specific proportion with a computed respective user-specific proportion.

13. The method of claim 10, wherein the sliding window has a predetermined size of one of: a predefined number of past user sessions with the content recommendation service, and a predetermined period of time.

14. The method of claim 3, further comprising, prior to the generating the plurality of content items:
summing, by the server, the associated respective user-specific proportions to obtain a sum of user-specific proportions; and
in response to the sum of user-specific proportions being one of: under a predetermined summation threshold and over the predetermined summation threshold:
adjusting, by the server, each of the associated respective user-specific proportions such that the sum of user-specific proportion is equal to the predetermined summation threshold.

15. A system for determining user-specific proportions of at least two types of content for content recommendations to a given user, the given user being associated with an electronic device, the electronic device being connected to the system over a communication network, the system hosting a content recommendation service, the content recommendation service for generating the content recommendations having content items of the at least two types of content,
the system comprising:
a processor;
a non-transitory computer-readable medium comprising instructions, the processor;

upon executing the instructions, being configured to:
acquire for each respective type of content of the at least two types of content, an indication of a respective base interval of proportion;
acquire for each respective type of content of the at least two types of content, a respective set of user interaction parameters, the respective set of user interaction parameters being indicative of user engagement of a respective set of users of the content recommendation service with the respective type of content;
compute for each respective type of content of the at least two types of content, an associated respective distribution of user interaction parameters based on the respective set of user interaction parameters of the respective set of users;
in response to receiving an indication of a personalized content request from the electronic device associated with the given user:
acquire for each respective type of content of the at least two types of content, an associated respective user-specific interaction parameter of the given user, the associated respective user-specific interaction parameter being indicative of user preference of the given user for the respective type of content;
compute for each respective type of content of the at least two types of content, a respective user-specific proportion of the respective type of content for content recommendation to the given user, the respective user-specific proportion being within the respective base interval of proportion, the computing being based on:
the associated respective distribution of user interaction parameters of the set of users, and the associated respective user-specific interaction parameter of the given user;
generate, by the content recommendation service of the system, a plurality of content items for personalized content recommendation for the given user, the plurality of content items being of the at least two types of content, a respective portion of the plurality of content items being within the respective user-specific proportion; and
send the plurality of content items for displaying on the electronic device of the given user.

16. The system of claim 15, wherein:
prior to the computing the respective user-specific proportion of the respective type of content, the processor is further configured to:
compute a respective central distribution parameter of the associated respective distribution of user interaction parameters;
determine a respective user-specific distribution parameter of the given user, the respective user-specific distribution parameter being indicative of a location of the associated respective user-specific interaction parameter of the given user in the associated respective distribution of user interaction parameters;
compute a displacement between the respective central distribution parameter and the respective user-specific distribution parameter; and wherein
the computing the respective user-specific proportion of the respective type of content is further based on:
the displacement between the respective central distribution parameter and the respective user-specific distribution parameter, and a respective central proportion of the respective base interval of proportions that corresponds to the respective central distribution parameter of the associated respective distribution of user interaction parameters.

17. The system of claim 16, wherein the computing the respective user-specific proportion of the respective type of content further comprises:
determine if a direction of the displacement between the respective central distribution parameter and the respective user-specific distribution parameter is one of: a positive direction, and a negative direction;
in response to the direction being positive:
assign a respective first predetermined value to the respective user-specific proportion, the respective first predetermined value being above the respective central proportion; and
in response to the direction being negative:
assign a respective second predetermined value to the respective user-specific proportion, the respective second predetermined value being below the respective central proportion.

18. The system of claim 17, wherein:
a respective distance between the respective first predetermined value and the respective central proportion on the base interval of proportions is proportional to a magnitude of the displacement between the respective central distribution parameter and the respective user-specific distribution parameter; and
a respective distance between the respective second predetermined value and the respective central proportion on the base interval of proportions is proportional to the magnitude of the displacement between the respective central distribution parameter and the respective user-specific distribution parameter.

19. The system of claim 18, wherein:
the respective central distribution parameter is a median of the associated respective distribution of user interactions.

20. The system of claim 19, wherein:
the respective central proportion is a median of the respective base interval of proportion.

21. The system of claim 20, wherein:
the respective user-specific distribution parameter is a percentile rank of the respective user-specific interaction parameter of the given user in the respective distribution of user interaction parameters.

22. The system of claim 17, wherein the at least two types of content include at least two of: text content, native content, non-native content, image content, video content, audio content, and weather content.

23. The system of claim 22, wherein:
the respective set of user interaction parameters and the respective user-specific interaction parameter associated with the respective type of content of the at least two types of content are a same type of interaction parameter; and
the system further comprises, using as the same type of interaction parameter for the respective type of content:
for the text content, a click-through rate (CTR);
for the native content, a click-through rate (CTR);
for the non-native content, a click-through rate (CTR);
for the image content, a click-through rate (CTR);
for the video content, a dwell time;
for the audio content, a dwell time; and
for the weather content, a click-through rate (CTR).

24. The system of claim 18, wherein:
the system is connected to a log database;
to acquire the respective user-specific interaction parameter, the processor is further configured to:
apply a sliding window of past user interactions to user interactions associated with the given user in the log database; and
compute the respective user-specific interaction parameter based on the user interactions associated with the given user in the log database that fall within the sliding window of past user interactions.

25. The system of claim 24, wherein the processor is further configured to, in response to a respective number of the user interactions associated with the given user that fall within the sliding window of past user interactions being below a predetermined threshold of user interactions:
assign a respective predetermined value to the respective user-specific proportion.

26. The system of claim 25, wherein the processor is further configured to:
receive another indication of a personalized content request from the electronic device associated with the given user after the indication of the personalized content request;
determine if a then respective number of user interactions of the given user is above the predetermined threshold of user interactions; and
in response to the then respective number of user interactions of the given user being above the predetermined threshold of user interactions at a time of receiving the other personalized content request:
replace the respective predetermined value assigned to the respective user-specific proportion with a computed respective user-specific proportion.

27. The system of claim 24, wherein the sliding window has a predetermined size of one of: a predefined number of past user sessions with the recommendation system, and a predetermined period of time.

28. The system of claim 17, wherein the processor is further configured to, prior to the generating the plurality of content items:
sum the associated respective user-specific proportions to obtain a sum of user-specific proportions; and
in response to the sum of user-specific proportions being one of: under a predetermined summation threshold and over the predetermined summation threshold:
adjust each of the associated respective user-specific proportions such that the sum of user-specific proportion is equal to the predetermined summation threshold.

* * * * *